United States Patent
Zhang et al.

(10) Patent No.: US 11,350,318 B2
(45) Date of Patent: May 31, 2022

(54) MULTICHANNEL DATA TRANSMISSION METHOD AND APPARATUS

(71) Applicant: Tencent Technology (Shenzhen) Company Limited, Shenzhen (CN)

(72) Inventors: Dan Zhang, Shenzhen (CN); Binhui Ning, Shenzhen (CN); Jingjing Hao, Shenzhen (CN); Feihu Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/017,531

(22) Filed: Sep. 10, 2020

(65) Prior Publication Data
US 2020/0413299 A1    Dec. 31, 2020

Related U.S. Application Data

(63) Continuation of application No. PCT/CN2019/092467, filed on Jun. 24, 2019.

(30) Foreign Application Priority Data

Aug. 15, 2018   (CN) .......................... 201810931095.7

(51) Int. Cl.
*H04W 36/00*        (2009.01)
*H04L 67/56*        (2022.01)
(Continued)

(52) U.S. Cl.
CPC ......... *H04W 36/0027* (2013.01); *H04L 67/28* (2013.01); *H04L 69/22* (2013.01); *H04W 36/165* (2013.01)

(58) Field of Classification Search
CPC .......... H04W 36/0027; H04W 36/165; H04W 88/06; H04W 84/12; H04W 76/16;
(Continued)

(56) References Cited

U.S. PATENT DOCUMENTS 9,871,720 B1    1/2018  Tillotson
2004/0190537 A1*  9/2004  Ferguson ................ H04L 47/30
                                                    370/395.3
(Continued)

FOREIGN PATENT DOCUMENTS

CN       102291856 A      12/2011
CN       103404048 A      11/2013
(Continued)

OTHER PUBLICATIONS

3GPP TR23.793 V0.6.0: 3rd Generation Partnership Project; Technical Specification Group Services and System Aspects; Study on Access Traffic Steering, Switching and Splitting support in the 5G system architecture, Release 16, Jul. 2018.*

(Continued)

*Primary Examiner* — Gary Mui
*Assistant Examiner* — Mohammed M Murshid
(74) *Attorney, Agent, or Firm* — Morgan, Lewis & Bockius LLP

(57) ABSTRACT

This application provides a multichannel data transmission method performed at a proxy server when communicating with a mobile terminal and a target service server. The multichannel data transmission method includes: receiving, from the mobile terminal, a plurality of uplink data packets in parallel through a plurality of channels, parsing the plurality of uplink data packets to obtain a plurality of target service data packets and a plurality of uplink packet headers, performing deduplication processing on the plurality of target service data packets according to the plurality of (Continued)

uplink packet headers, and transmitting the target service data packets reserved after the deduplication processing to the target service server, each uplink packet headers including a packet sequence number of each uplink data packet. The uplink data packets can be transmitted in parallel through the plurality of channels, and reliable and effective transmission of target service data packets is implemented through deduplication processing.

18 Claims, 16 Drawing Sheets

(51) Int. Cl.
*H04L 69/22* (2022.01)
*H04W 36/16* (2009.01)

(58) Field of Classification Search
CPC .... H04W 36/0011; H04L 67/28; H04L 69/22; H04L 67/2814; H04L 45/245; H04L 47/34; H04L 69/14
See application file for complete search history.

(56) References Cited

U.S. PATENT DOCUMENTS

| | | | |
|---|---|---|---|
| 2009/0031419 A1* | 1/2009 | Laksono | H04N 21/41265 726/21 |
| 2013/0064198 A1 | 3/2013 | Krishnaswamy et al. | |
| 2016/0373339 A1* | 12/2016 | Teyeb | H04L 45/24 |
| 2017/0279738 A1 | 9/2017 | Cai | |
| 2017/0325124 A1* | 11/2017 | Mitra | H04W 28/06 |
| 2019/0058675 A1* | 2/2019 | Schubert | H04L 47/30 |

FOREIGN PATENT DOCUMENTS

| | | | | |
|---|---|---|---|---|
| CN | 104753627 | A | 7/2015 | |
| CN | 104967502 | A | 10/2015 | |
| CN | 106559840 | A | 4/2017 | |
| CN | 108207014 | A | 6/2018 | |
| JP | 2017028589 | A | 2/2017 | |
| WO | WO2014180235 | * | 11/2014 | ............. H04L 29/06 |
| WO | WO 2014180235 | A1 | 11/2014 | |
| WO | WO 2015174901 | A1 | 11/2015 | |

OTHER PUBLICATIONS

3GPP TR23.793 V0.6.0: 3rd Generation Partnership Project; Technical Specification Group Services and System Aspects; Study on Access Traffic Steering, Switching and Splitting support in the 5G system architecture, Release 16, 2018. (Year: 2018).*
Tencent Technology, ISR, PCT/CN2019/092467, Sep. 16, 2019, 2 pgs.
Yuichi Ito et al., "Opportunistic Bandwidth Trading for Multiaccess Wireless Devices", IEICE Technical Report of Electronics, Information and Communication Engineers, vol. 110, No. 448, Feb. 24, 2011, 7 pgs.
Tencent Technology, WO, PCT/CN2019/092467, Sep. 16, 2019, 4 pgs.
Tencent Technology, IPRP, PCT/CN2019/092467, Feb. 16, 2021, 5 pgs.
Technical Report, "3rd Generation Partnership Project; Technical Specification Group Services and System Aspects; Study on Access Traffic Steering, Switching and Splitting Support in the 5G System Architecture (Release 16)", 3GPP TR 23.793, V0.6.0, Aug. 13, 2018, XP051475132, 80 pgs.
Extended European Search Report, 19850324,5, dated Mar. 5, 2021, 12 pgs.

* cited by examiner

MULTICHANNEL DATA TRANSMISSION METHOD AND APPARATUS

CROSS REFERENCE TO RELATED APPLICATIONS

This application is a continuation application of PCT Patent Application No. PCT/CN2019/092467, entitled "MULTICHANNEL DATA TRANSMISSION METHOD AND APPARATUS" filed on Jun. 24, 2019, which claims priority to Chinese Patent Application No. 201810931095.7, entitled "MULTICHANNEL DATA TRANSMISSION METHOD AND APPARATUS" filed on Aug. 15, 2018, all of which are incorporated by reference in their entirety.

FIELD OF THE TECHNOLOGY

This application relates to the field of computer technologies, and in particular, to a data transmission technology.

BACKGROUND OF THE DISCLOSURE

Currently, data transmission is generally implemented through a wireless fidelity (Wi-Fi) channel or a cellular network. The cellular network may include a global system for mobile communication (GSM network, a code division multiple access (CDMA) network, a frequency division multiple access (FDMA) network, a time division multiple access (TDMA) network, and a 3G/4G/5G channel. The 3rd generation partnership project (3GPP) aims at implementing smooth transition from a 2G network to a 3G/4G/5G network, to ensure backward compatibility of a future technology and support easy networking and roaming and compatibility between systems. The data transmission under a Wi-Fi channel has an advantage of a low delay, but the Wi-Fi channel is unstable, and phenomena such as channel interference, co-frequency interference, and worse signal strength are easily caused, resulting in a high delay from a terminal to a Wi-Fi hotspot and a packet loss. Although being relatively stable, the cellular network (for example, 4G) has a higher delay than Wi-Fi.

That is, in the related art, whichever network is selected by a terminal for transmitting data, user experience may be affected. Especially during transmission of game data, the impact is more obvious. This is because a similar application such as a real-time mobile game faces frequent communication between a client and a server end, and a high-frequency small packet is mainly used. This type of application has a quite high requirement on a network environment, and has a strong requirement on a low delay and high stability. In addition, channel contention exists in the principle of the carrier sense multiple access/collision avoidance (CSMA/CA) mechanism of Wi-Fi, the Wi-Fi channel overlaps or interferes with each other at the same frequency, and a poor signal, and the like both cause a service packet loss or an increased delay.

In the related art, to improve a data transmission effect of a game, there is a preferred single-channel packet sending solution that supports Wi-Fi and 4G channels, that is, when a Wi-Fi signal is worse, the 4G channel is used to send a packet. However, the single-channel packet sending solution has at least the following disadvantages:

First, an operation of switching to 4G channel transmission is started only when a Wi-Fi network has been worse, and the operation belongs to a post-remedial measure. In this case, user experience has been damaged.

Second, it is difficult for a user to adapt to network switching of a game client caused by an operation such as switching of a network environment. This may bring severe stuck experience to the user.

Third, during network jitter, data can only be switched from a path of a relatively bad network to a path of a relatively good network. For example, when Wi-Fi is worse, some data packets are sent through a 4G channel, and when Wi-Fi or 4G network jitter occurs, a data packet loss and a high delay situation cannot be avoided.

In conclusion, it can be learned that a new data transmission method is currently required to ensure stable data transmission.

Information partially disclosed in the background is only used for enhancing the understanding of the background of this application, and therefore, may include information that does not constitute a limitation on the related art known to a person of ordinary skill in the art.

SUMMARY

Embodiments of this application are intended to provide a multichannel data transmission method and apparatus, a computer-readable medium, and an electronic device, to resolve problems such as a stuck network, a packet loss, and a high delay in a data transmission process in the related art.

Other features and advantages of this application become obvious through the following detailed descriptions, or may be learned partially by the practice of this application.

According to an aspect of this application, a multichannel data transmission method is provided and applied to a proxy server, including: receiving, from a mobile terminal, a plurality of uplink data packets in parallel through a plurality of channels, parsing the plurality of uplink data packets to obtain a plurality of target service data packets and a plurality of uplink packet headers, performing deduplication processing on the plurality of target service data packets according to the plurality of uplink packet headers, and transmitting the target service data packets reserved after the deduplication processing to a target service server, each uplink packet header including a packet sequence number of each uplink data packet.

In an exemplary embodiment of this application, the performing deduplication processing on the plurality of target service data packets according to the plurality of uplink packet headers includes: discarding a corresponding target service data packet in a case that (i) (MaxSeqno-curSeqno)>recvThred, or (ii) (MaxSeqno-curSeqno)≤recvThred and curSeqno is not in an unreceived packet set; reserving a corresponding target service data packet in a case that (i) curSeqno>MaxSeqno, or (ii) MaxSeqno-curSeqno) ≤recvThred and curSeqno is in the unreceived packet set, curSeqno being a packet sequence number of the uplink data packet, MaxSeqno being a maximum received packet sequence number of a client, and recVThred being a first threshold.

In an exemplary embodiment of this application, the performing deduplication processing on the plurality of target service data packets according to the plurality of uplink packet headers includes: when a packet sequence number of an uplink data packet is different from all packet sequence numbers in a sequence number queue, adding the packet sequence number of the uplink data packet to the sequence number queue and reserving a corresponding target service data packet for the uplink data packet; and when the packet sequence number of the uplink data packet is the same as one packet sequence number in the sequence number queue, discarding a corresponding target service data packet for the uplink data packet.

In an exemplary embodiment of this application, each uplink packet header further includes a channel identifier and channel information of the uplink data packet, and the method further includes: determining a channel type of the uplink data packet according to the channel identifier, and updating channel information of a corresponding channel type in a case that the packet sequence number of the uplink data packet is greater than a maximum received packet sequence number of a channel of the corresponding channel type and corresponding channel information is inconsistent with channel information stored in the corresponding channel type.

In an exemplary embodiment of this application, the method further includes: receiving response data packets generated by the target service server in response to the target service data packets, separately encapsulating corresponding downlink packet headers for the response data packets according to latest channel information of channel types, to generate a plurality of downlink data packets, and transmitting the plurality of downlink data packets to the mobile terminal in parallel through the plurality of channels.

In an exemplary embodiment of this application, the mobile terminal is configured to perform operations including: obtaining target service data packets, separately encapsulating uplink packet headers for the target service data packets, to form a plurality of uplink data packets, and transmitting the plurality of uplink data packets to a proxy server in parallel through a plurality of channels, each uplink packet header including a packet sequence number of each uplink data packet.

In an exemplary embodiment of this application, the mobile terminal is further configured to perform operations including: receiving, in parallel through the plurality of channels, a plurality of downlink data packets generated in response to the target service data packets, parsing the plurality of downlink data packets to obtain a plurality of response data packets and a plurality of downlink packet headers, and performing deduplication processing on the plurality of response data packets according to the plurality of downlink packet headers.

In an exemplary embodiment of this application, the mobile terminal is further configured to perform operations including: obtaining target service server information according to a service configuration request, setting a filtering policy according to the target service server information, and intercepting the target service data packets according to the filtering policy.

According to an aspect of this application, a multichannel data transmission apparatus is provided, including: an uplink data receiving module, configured to receive a plurality of uplink data packets in parallel through a plurality of channels, an uplink data parsing module, configured to parse the plurality of uplink data packets to obtain a plurality of target service data packets and a plurality of uplink packet headers, an uplink data deduplication module, configured to perform deduplication processing on the plurality of target service data packets according to the plurality of uplink packet headers, and an uplink data forwarding module, configured to transmit the target service data packets reserved after the deduplication processing to a target service server, each uplink packet header including a packet sequence number of each uplink data packet.

According to an aspect of this application, a multichannel data transmission apparatus is provided, including: a target data obtaining module, configured to obtain target service data packets, an uplink packet header encapsulation module, configured to separately, encapsulate uplink packet headers for the target service data packets, to form a plurality of uplink data packets, and an uplink data transmission module, configured to transmit the plurality of uplink data packets to a proxy server in parallel through a plurality of channels, each uplink packet header including a packet sequence number of each uplink data packet.

According to an aspect of this application, a multichannel data transmission system is provided, including: a service client, configured to obtain target service data packets, separately encapsulate uplink packet headers for the target service data packets, to form a plurality of uplink data packets, and transmit the plurality of uplink data packets, and a proxy server, configured to receive the plurality of uplink data packets in parallel through a plurality of channels, parse the plurality of uplink data packets to obtain a plurality of target service data packets and a plurality of uplink packet headers, perform deduplication processing on the plurality of target service data packets according to the plurality of uplink packet headers, and transmit the target service data packets reserved after the deduplication processing to a target service server.

In an exemplary embodiment of this application, the proxy server is further configured to receive response data packets generated by the target service server in response to the target service data packets, separately encapsulate corresponding downlink packet headers for the response data packets according to latest channel information of channel types, to generate a plurality of downlink data packets, and transmit the plurality of downlink data packets; and the service client is further configured to receive the plurality of downlink data packets in parallel through the plurality of channels, parse the plurality of downlink data packets to obtain a plurality of response data packets and a plurality of downlink packet headers, and perform deduplication processing on the plurality of response data packets according to the plurality of downlink packet headers.

In an exemplary embodiment of this application, the apparatus further includes: a load balancing server, configured to receive the plurality of uplink data packets in parallel through the plurality of channels, determine a proxy server of the plurality of uplink data packets according to uplink packet headers, and transmit the plurality of uplink data packets to the proxy server in parallel through the plurality of channels.

According to an aspect of this application, a non-transitory computer-readable medium is provided, storing a plurality of computer programs that, when executed by one or more processors of a proxy server, implementing the method according to any one of the foregoing embodiments.

According to an aspect of this application, a proxy server is provided, including: one or more processors, and a storage apparatus, configured to store one or more computer programs, the one or more computer programs, when executed by the one or more processors, causing the proxy server to implement the method according to any one of the foregoing embodiments.

In the technical solutions provided in some embodiments of this application, a plurality of uplink data packets are received in parallel through a plurality of channels, the plurality of uplink data packets are parsed to obtain a plurality of target service data packets and a plurality of uplink packet headers, then, deduplication processing is performed on the plurality of target service data packets according to the plurality of uplink packet headers, and next, the target service data packets reserved after the deduplication processing are transmitted to a target service server. Each uplink packet header includes a packet sequence number of each uplink data packet. On one hand, packets are received simultaneously through a plurality of channels, so that transmission stability and effectiveness of the target service data packets can be ensured. On the other hand, uplink data packets received in parallel are aggregated and deduplicated and then forwarded to a target service server, and the target service server is shielded from network changes, thereby ensuring that the target service server is unaware of changes of different network environments, and running of the target service server is not affected.

It is to be understood that, the foregoing general descriptions and the following detailed descriptions are merely for illustration and explanation purposes and are not intended to limit this application.

BRIEF DESCRIPTION OF THE DRAWINGS

The accompanying drawings herein are included in the specification and form a part of the specification, show embodiments that conform to this application, and are used to describe a principle of this application together with the specification. Obviously, the accompanying drawings described below are only some embodiments of this application, and a person of ordinary skill in the art can obtain other accompanying drawings according to these accompanying drawings without creative efforts. In the drawings.

DESCRIPTION OF EMBODIMENTS

At present, the examples of implementations are described comprehensively with reference to the accompanying drawings. However, the examples of implementations may be implemented in multiple forms, and it is not to be understood as being limited to the examples described herein. Conversely, the implementations are provided to make this application more comprehensive and complete, and comprehensively convey the idea of the examples of the implementations to a person skilled in the art.

In addition, the described characteristics, structures, or features may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompany drawings are merely functional entities and do not necessarily correspond to physically independent entities. That is, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely exemplary descriptions and do not necessarily include all of the content and operations/steps, nor are they necessarily performed in the sequence described. For example, some operations/steps may be further divided, and some operations/steps may be combined or partially combined. Therefore, an actual execution sequence may be changed according to an actual situation.

Figure 1:
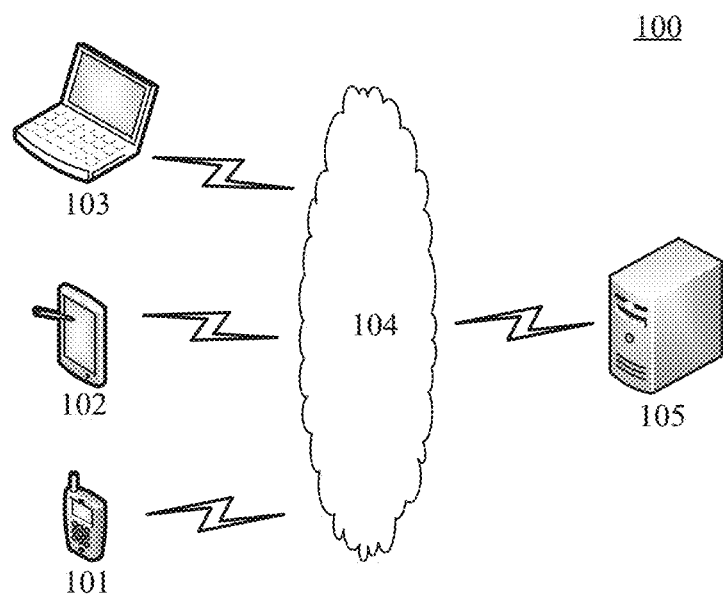
FIG. 1 is a schematic diagram of an exemplary system architecture to which a multichannel data transmission method or a multichannel data transmission apparatus according to the embodiments of this application may be applied.

FIG. 1 is a schematic diagram of an exemplary system architecture 100 to which a multichannel data transmission method or a multichannel data transmission apparatus according to the embodiments of this application may be applied.

As shown in FIG. 1, the system architecture 100 may include any one or more of terminal devices 101, 102, and 103, a network 104, and a server 105. The network 104 is configured to provide a medium of a communication link between the terminal devices 101, 102, and 103, and the server 105. The network 104 may include various connection types, for example, a wired communication link, a wireless communication link, or a fiber optic cable.

It is to be understood that quantities of the terminal devices, the networks, and the servers in FIG. 1 are merely exemplary. There may be any quantity of terminal devices, networks, and servers according to implementation requirements. For example, the server 105 may be a server cluster formed by a plurality of servers.

A user may interact with the server 105 by using the terminal devices 101, 102, and 103 through the network 104, to receive or send a message or the like. The terminal devices 101, 102, and 103 may be various electronic devices having a data transmission function and include but are not limited to a smartphone, a tablet computer, a portable computer, a desktop computer, an intelligent chatterbot, and the like.

The server 105 may be a server that provides a related service. For example, a user sends, by using the terminal device 103 (or the terminal device 101 or 102), a request for obtaining game-related information and/or resource to the server 105, the server 105 may correspondingly obtain the game-related information and/or resource based on the received information request of the game-related information and/or resource and feedback the game-related information and/or resource to the terminal device 103, and the terminal device 103 may further display the received game-related information and/or resource. The user sends, by using the terminal device 103 (or the terminal device 101 or 102), a game operation instruction to the server 105 according to the game-related information and/or resource displayed on the terminal device 103, the server 105 may correspondingly return an execution result of the game operation instruction to the terminal device 103 based on the received game operation instruction, and the terminal device 103 correspondingly displays the received execution result of the game operation instruction.

Figure 2:
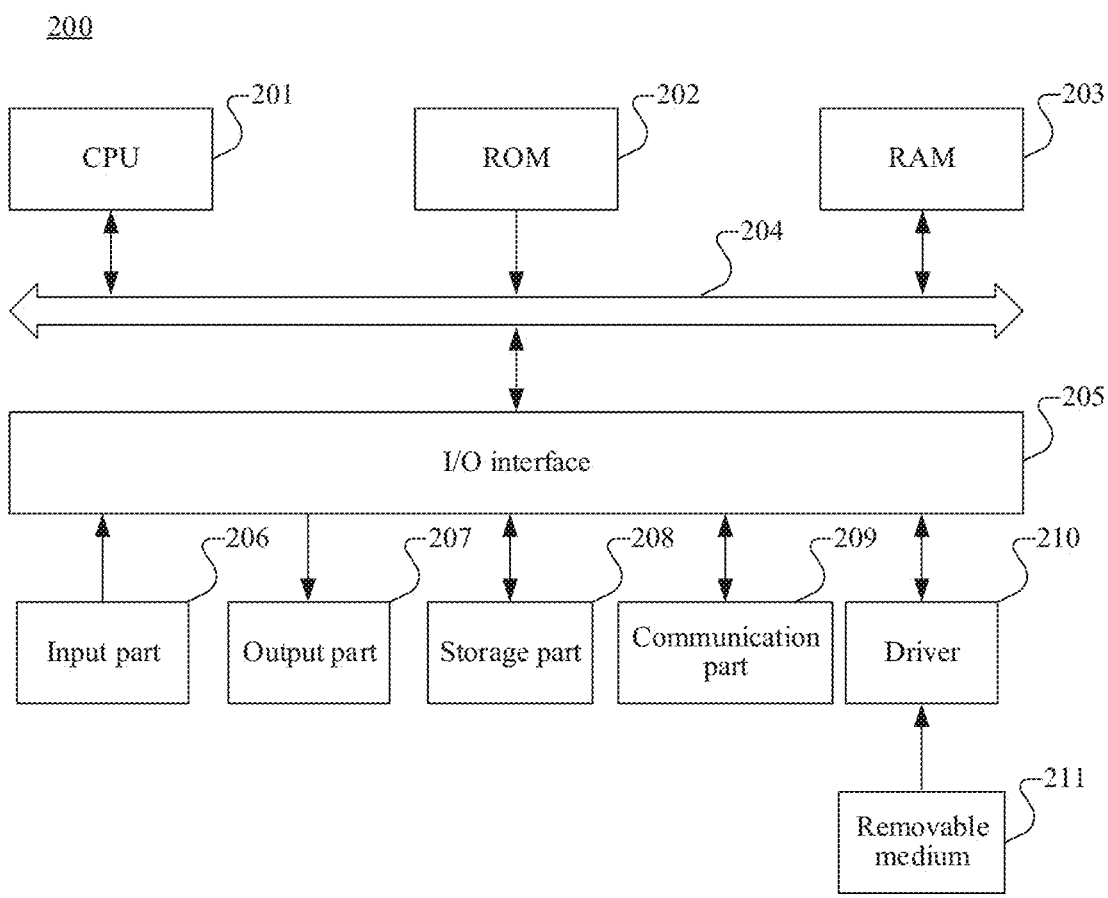
FIG. 2 is a schematic structural diagram of a computer system of an electronic device adapted to the embodiments of this application.

FIG. 2 is a schematic structural diagram of an electronic device adapted to implement the embodiments of this application.

A computer system 200 of the electronic device shown in FIG. 2 is merely an example, and does not constitute any limitation on functions and use ranges of the embodiments of this application.

As shown in FIG. 2, the computer system 200 includes a central processing unit (CPU) 201, which may perform various proper actions and processing based on a program stored in a read-only memory (ROM) 202 or a program loaded from a storage part 208 into a random access memory (RAM) 203. The RAM 203 further stores various programs and data required for system operation. The CPU 201, the ROM 202, and the RAM 203 are connected to each other by using a bus 204. An input/output (I/O) interface 205 is also connected to the bus 204.

The following components are connected to the I/O interface 205: an input part 206 including a keyboard, a mouse, or the like, an output part 207 including a cathode ray tube (CRT), a liquid crystal display (LCD), a speaker, or the like, a storage part 208 including a hard disk, or the like, and a communication part 209 including a network interface card such as a LAN card or a modem. The communication part 209 performs communication processing by using a network such as the Internet. A driver 210 is also connected to the I/O interface 205 as required. A removable medium 211 such as a magnetic disk, an optical disc, a magneto-optical disk, or a semiconductor memory is installed on the driver 210 as required, so that a computer program read from the removable medium 211 is installed into the storage part 208 as required.

Particularly, according to the embodiments of this application, the processes described below by referring to the flowcharts may be implemented as computer software programs. For example, an embodiment of this application includes a computer program product, which includes a computer program stored in a computer-readable medium. The computer program includes program code used for performing the methods shown in the flowcharts. In such an embodiment, by using the communication part 209, the computer program may be downloaded and installed from a network, and/or installed from the removable medium 211. When the computer program is executed by the CPU 201, the various functions defined in the method and/or apparatus of this application are executed.

The computer-readable medium in this application may be a computer-readable signal medium or a non-transitory computer-readable storage medium or any combination thereof. The computer-readable storage medium may be, but not limited to, an electric, magnetic, optical, electromagnetic, infrared, or semi-conductive system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM or flash memory), an optical fiber, a compact disk read-only memory (CD-ROM), an optical storage device, a magnetic storage device, or any appropriate combination thereof. In this application, the computer-readable storage medium may be any tangible medium including or storing a program, and the program may be used by or in combination with an instruction execution system, apparatus, or device. In this application, the computer-readable signal medium may include a data signal transmitted in a baseband or as part of a carrier, and stores computer-readable program code. The propagated data signal may be in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may be configured to send, propagate, or transmit a program configured to be used by or in combination with an instruction execution system, apparatus, or device. The program code included in the computer-readable medium may be transmitted by using any suitable medium, including but not limited to, wireless transmission, a wire, a cable, radio frequency (RF) or the like, or any suitable combination of thereof.

The flowcharts and block diagrams in the accompanying drawings show architectures, functions, and operations that may be implemented for the method, the apparatus, and the computer program product according to the embodiments of this application. In this regard, each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively be occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related module and/or unit described in the embodiments of this application may be implemented in a software manner, or may be implemented in a hardware manner. The described module and/or unit may alternatively be disposed in a processor. Names of these modules and/or units do not constitute a limitation on the modules and/or units in a case.

According to another aspect, this application further provides a computer-readable medium. The computer-readable medium may be included in the electronic device described in the foregoing embodiments, or may exist alone and is not assembled in the electronic device. The computer-readable medium stores one or more programs. The one or more programs, when executed by the electronic device, cause the electronic device to implement the methods according to the following embodiments. For example, the electronic device may implement steps in any of the embodiments shown in FIG. 3 to FIG. 20.

Figure 3:
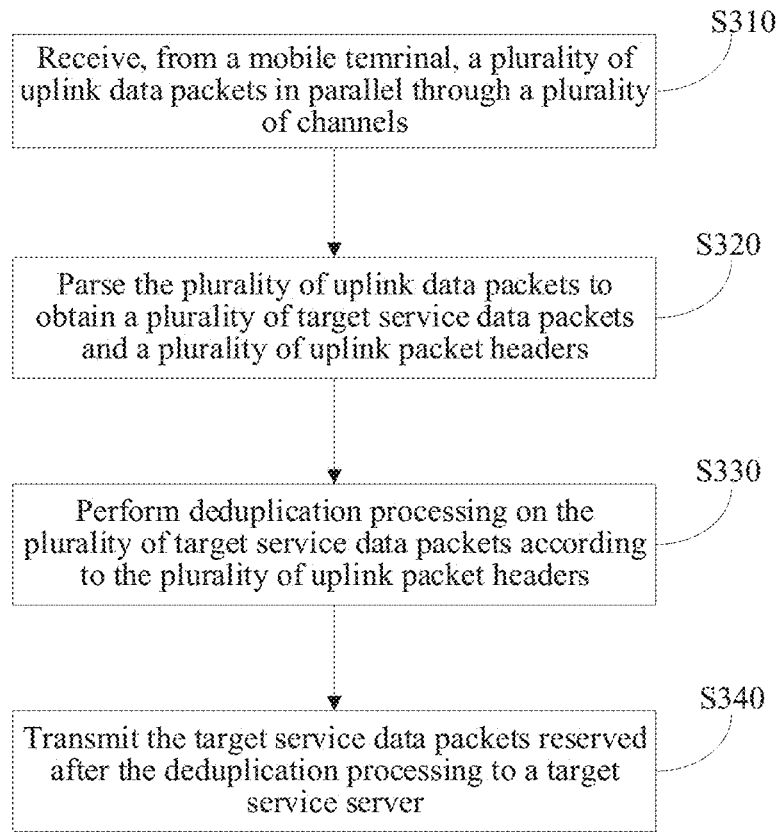
FIG. 3 is a schematic flowchart of a multichannel data transmission method according to an embodiment of this application.

FIG. 3 is a schematic flowchart of a multichannel data transmission method according to an embodiment of this application.

As shown in FIG. 3, the multichannel data transmission method provided in the implementation of this application may include the following steps. The method provided in the implementation of this application may be, for example, performed by a proxy server, but this application is not limited thereto.

Step S310. Receive, from a mobile terminal, a plurality of uplink data packets in parallel through a plurality of channels.

In this embodiment of this application, a quantity and a type of channels are not limited, the quantity of channels may be determined according to a quantity of communication channels that can be supported between a client and the proxy server, for example, may include at least two of a Wi-Fi channel, a 3G/4G/5G channel, a wired channel, and the like.

In this embodiment of this application, each uplink data packet may include an uplink packet header and a target service data packet. The uplink packet header may further include an uplink internal communication packet header and an uplink channel packet header, and the uplink internal communication packet header may include a service client address for sending the uplink data packet to the proxy server.

Step S320. Parse the plurality of uplink data packets to obtain a plurality of target service data packets and a plurality of uplink packet headers.

In this embodiment of this application, an uplink packet header in each uplink data packet is removed from the uplink data packet, to obtain a target service data packet.

Step S330. Perform deduplication processing on the plurality of target service data packets according to the plurality of uplink packet headers.

Each uplink packet header includes a packet sequence number of each uplink data packet.

In an exemplary embodiment, each uplink packet header may further include a channel identifier and channel information of each uplink data packet. The channel identifier is used for identifying a channel through which a current uplink data packet is sent. The channel information may include a channel address of the current uplink data packet, for example, an Internet Protocol (IP) address or a port of a Wi-Fi channel.

In an exemplary embodiment, the performing deduplication processing on the plurality of target service data packets according to the plurality of uplink packet headers may include: discarding a target service data packet in a case that (i) (MaxSeqno-curSeqno)>recvThred, or (ii) (MaxSeqno-curSeqno)≤recvThred and curSeqno is not in an unreceived packet set, reserving a corresponding target service data packet in a case that (i) curSeqno>MaxSeqno, or (ii) (MaxSeqno-curSeqno)≤recvThred and curSeqno is in the unreceived packet set, curSeqno being a packet sequence number of the uplink data packet, MaxSeqno being a maximum received packet sequence number of a client, and recvThred being a first threshold.

For example, assuming that the first threshold recvThred is 10, if a maximum received packet sequence number MaxSeqno of a current client is 20 and a packet sequence number curSeqno of a current received uplink data packet is 5, in this case. MaxSeqno-curSeqno=20−5=15>10, and the uplink data packet with the packet sequence number of 5 is discarded.

In another example, assuming that the first threshold recvThred is 10, if a maximum received packet sequence number MaxSeqno of a current client is 20 and a packet sequence number curSeqno of a current received uplink data packet is 15, in this case, MaxSeqno-curSeqno=20−15=5<10, the unreceived packet set does not include the packet sequence number 15, and similarly the uplink data packet with the packet sequence number of 15 is discarded.

In still another example, assuming that the first threshold recvThred is 10, if a maximum received packet sequence number MaxSeqno of a current client is 20 and a packet sequence number curSeqno of a current received uplink data packet is 15, in this case, MaxSeqno-curSeqno=20−15=5<10, the unreceived packet set includes the packet sequence number 15, and the uplink data packet with the packet sequence number of 15 is reserved, and the packet sequence number 15 is deleted from the unreceived packet set.

In an exemplary embodiment, the performing deduplication processing on the plurality of target service data packets according to the plurality of uplink packet headers may include: adding the packet sequence number of the uplink data packet to a sequence number queue in a case that the packet sequence number of the uplink data packet is different from packet sequence numbers in the sequence number queue, and reserving a corresponding target service data packet; and discarding a corresponding target service data packet in a case that the packet sequence number of the uplink data packet is the same as any packet sequence number in the sequence number queue.

In an exemplary embodiment, the method may further include: determining a channel type of the uplink data packet according to the channel identifier, and updating channel information of a corresponding channel type in a case that the packet sequence number of the uplink data packet is greater than a maximum received packet sequence number of a channel of the corresponding channel type and corresponding channel information is not consistent with channel information stored in the corresponding channel type.

Step S340. Transmit the target service data packets reserved after the deduplication processing to a target service server.

In an exemplary embodiment, the method may further include: receiving response data packets generated by the target service server in response to the target service data packets, separately encapsulating corresponding downlink packet headers for the response data packets according to latest channel information of channel types, to generate a plurality of downlink data packets, and transmitting the plurality of downlink data packets to a service client in parallel through the plurality of channels.

In the multichannel data transmission method provided in the implementation of this application, a plurality of uplink data packets are received in parallel through a plurality of channels, the plurality of uplink data packets are parsed to obtain a plurality of target service data packets and a plurality of uplink packet headers, then, deduplication processing is performed on the plurality of target service data packets according to the plurality of uplink packet headers, and next, the target service data packets reserved after the deduplication processing are transmitted to a target service server, each uplink packet header including a packet sequence number of each uplink data packet. On one hand, packets are received simultaneously through a plurality of channels, so that transmission stability and effectiveness of the target service data packets can be ensured. On the other hand, uplink data packets received in parallel are aggregated and deduplicated and then forwarded to a target service server, and the target service server is shielded from network changes, thereby ensuring that the target service server is unaware of changes of different network environments, and running of the target service server is not affected.

Figure 4:
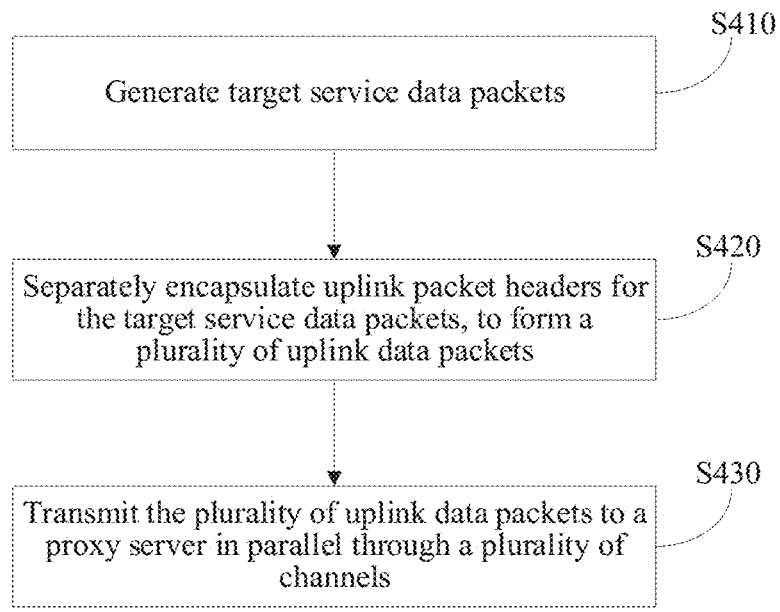
FIG. 4 is a schematic flowchart of a multichannel data transmission method according to another embodiment of this application.

FIG. 4 is a schematic flowchart of a multichannel data transmission method according to another embodiment of this application. The method provided in the implementation of this application may be, for example, performed by a service client, but this application is not limited thereto.

As shown in FIG. 4, the multichannel data transmission method provided in the implementation of this application may be performed at the mobile terminal by including the following steps.

Step S410. Obtain by generating target service data packets.

In an exemplary embodiment, the obtaining target service data packets may include: controlling a server according to a service configuration request, to obtain target service server information, setting a filtering policy according to the target service server information, and intercepting the target service data packets according to the filtering policy.

In the following embodiments, descriptions are provided by using examples in which the control server is a cloud control server, the target service server is a game server, the target service data packet is a game data packet, but this application is not limited thereto and may be set according to a specific application scenario.

Step S420. Separately encapsulate uplink packet headers for the target service data packets, to form a plurality of uplink data packets.

Each uplink packet header may include a packet sequence number of each uplink data packet.

Step S430. Transmit the plurality of uplink data packets to a proxy server in parallel through a plurality of channels.

In an exemplary embodiment, the method may further include: receiving, in parallel through the plurality of channels, a plurality of downlink data packets generated in response to the target service data packets, parsing the plurality of downlink data packets to obtain a plurality of response data packets and a plurality of downlink packet headers, and performing deduplication processing on the plurality of response data packets according to the plurality of downlink packet headers.

Figure 5:
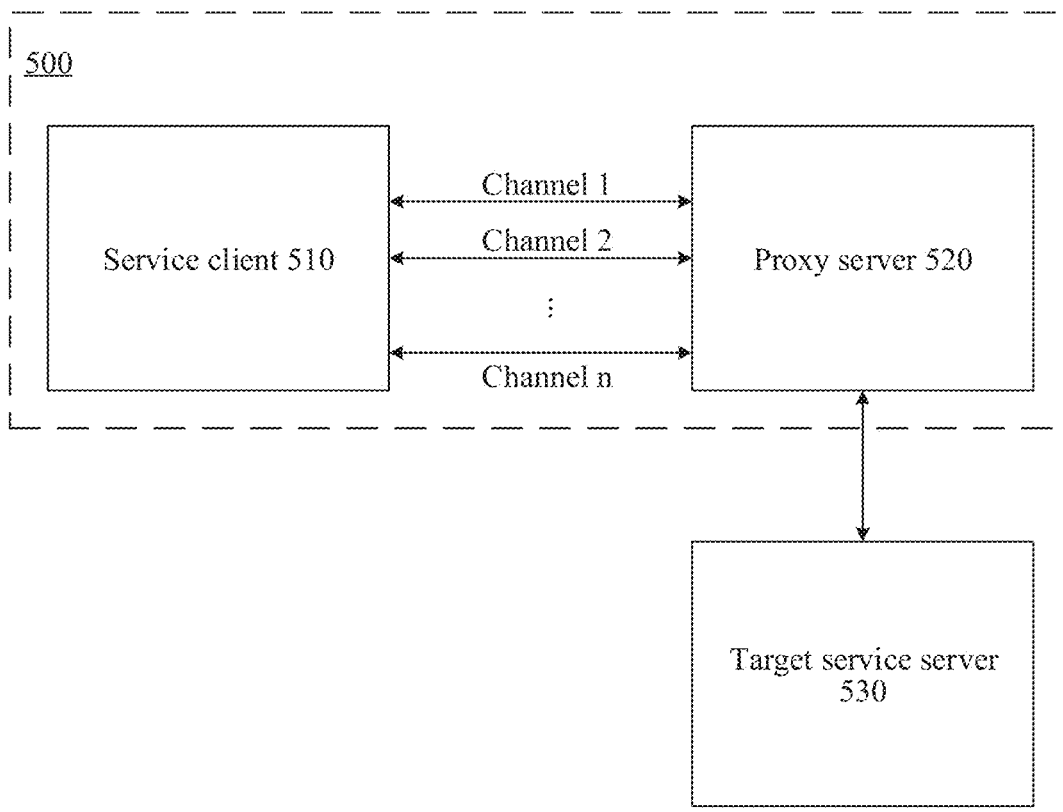
FIG. 5 is a schematic diagram of a multichannel data transmission system according to an embodiment of this application.

FIG. 5 is a schematic diagram of a multichannel data transmission system according to an embodiment of this application.

As shown in FIG. 5, the multichannel data transmission system 500 provided in the implementation of this application may include a service client 510 (e.g., the mobile terminal) and a proxy server 520. Parallel data transmission may be performed between the service client 510 and the proxy server 520 through a plurality of channels, for example, a channel 1, a channel 2, to a channel n (n is a positive integer greater than or equal to 2).

The service client 510 may be configured to obtain target service data packets, separately encapsulate uplink packet headers for the target service data packets, to form a plurality of uplink data packets, and transmit the plurality of uplink data packets.

The proxy server 520 may be configured to receive the plurality of uplink data packets in parallel through a plurality of channels, parse the plurality of uplink data packets to obtain a plurality of target service data packets and a plurality of uplink packet headers, perform deduplication processing on the plurality of target service data packets according to the plurality of uplink packet headers, and transmit the target service data packets reserved after the deduplication processing to a target service server 530.

In an exemplary embodiment, the proxy server 520 may be further configured to receive response data packets generated by the target service server 530 in response to the target service data packets, separately encapsulate corresponding downlink packet headers for the response data packets according to latest channel information of channel types, to generate a plurality of downlink data packets, and transmit the plurality of downlink data packets, and the service client 510 may be further configured to receive the plurality of downlink data packets in parallel through the plurality of channels, parse the plurality of downlink data packets to obtain a plurality of response data packets and a plurality of downlink packet headers, and perform deduplication processing on the plurality of response data packets according to the plurality of downlink packet headers.

Figure 6:
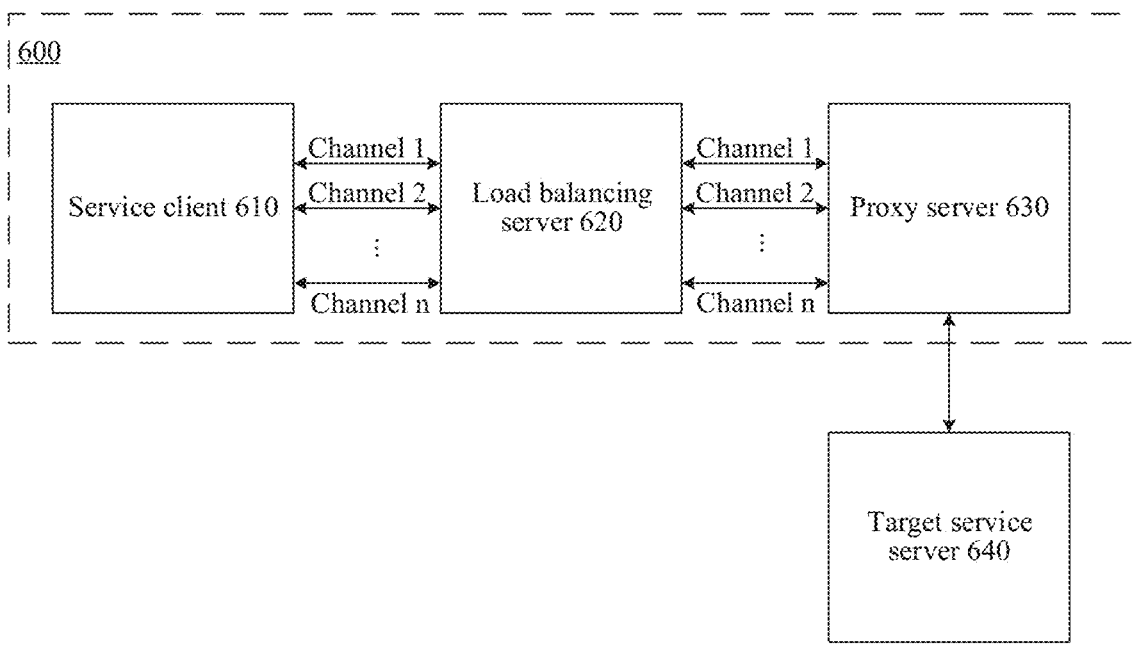
FIG. 6 is a schematic diagram of a multichannel data transmission system according to another embodiment of this application.

FIG. 6 is a schematic diagram of a multichannel data transmission system according to another embodiment of this application.

As shown in FIG. 6, the multichannel data transmission system 600 provided in the implementation of this application may include a service client 610, a load balancing server 620, and a proxy server 630. For the service client 610 and the proxy server 630, reference may be made to the service client 510 and the proxy server 520 in the embodiment of FIG. 5. Details are not described herein again.

A difference from the embodiment shown in FIG. 5 lies in that the multichannel data transmission system 600 provided in the implementation of this application may further include the load balancing server 620. The load balancing server 620 may be configured to receive the plurality of uplink data packets in parallel through the plurality of channels, determine a proxy server of the plurality of uplink data packets according to uplink packet headers, and transmit the plurality of uplink data packets to the proxy server 630 in parallel through the plurality of channels.

In this embodiment of this application, the method may further include that: after performing deduplication processing on the plurality of uplink data packets, the proxy server 630 sends deduplicated target service data packets to a target service server 640. Alternatively, the proxy server 630 may process response data packets returned by the target service server 640 in response to received target service data packets, to generate a plurality of downlink data packets and send the plurality of downlink data packets to the load balancing server 620 in parallel through the channel 1 to channel n, and the load balancing server 620 sends the plurality of downlink data packets to the service client 610 in parallel through the channel 1 to the channel n.

The following further describes the method and the system with reference to specific examples, which are not intended to limit this application.

Figure 7:
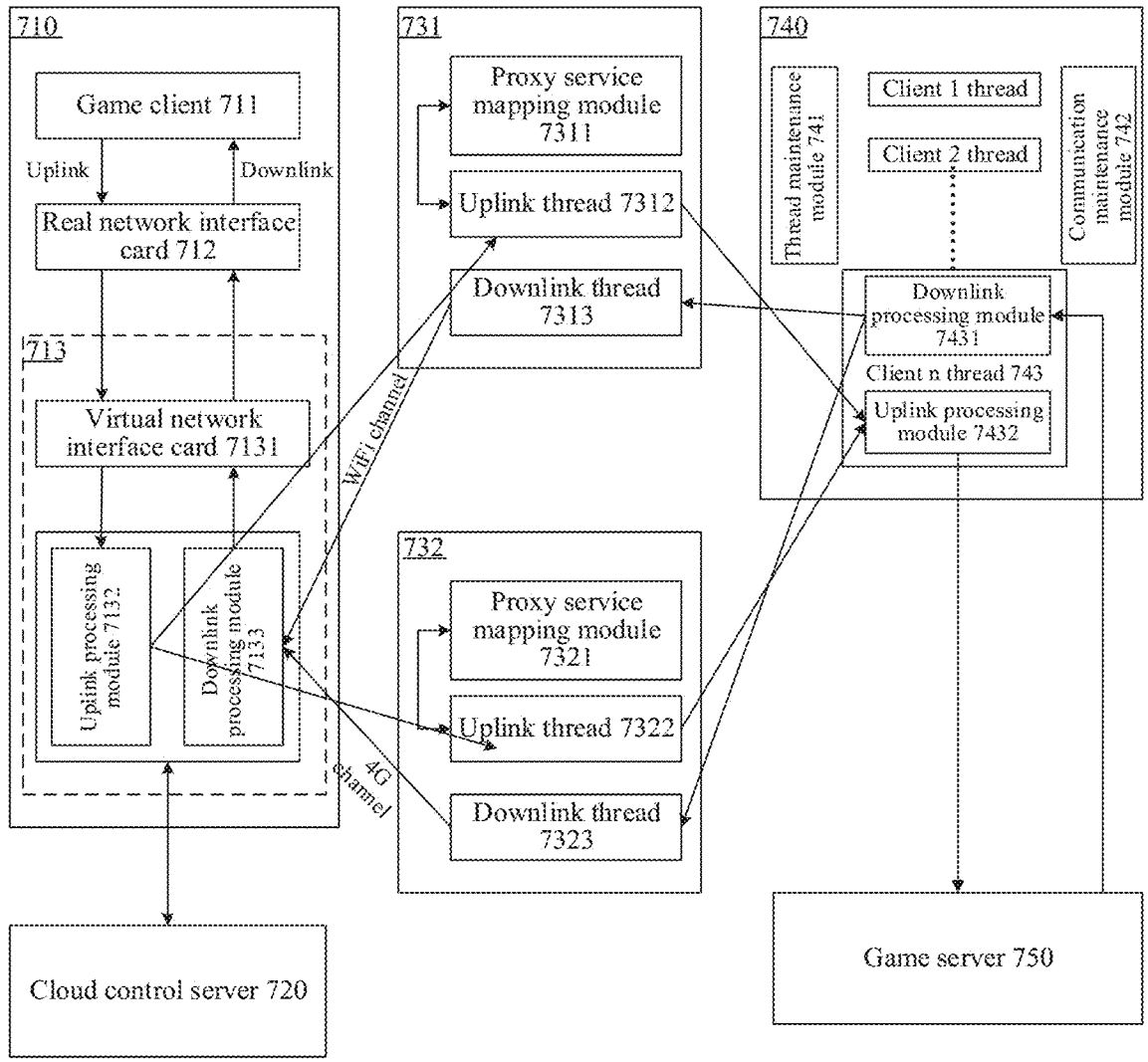
FIG. 7 is a schematic overall architectural diagram of a multichannel data transmission method according to an embodiment of this application.

FIG. 7 is a schematic overall architectural diagram of a multichannel data transmission method according to an embodiment of this application. Herein, an example in which a data transmission channel between a mobile phone client and a proxy server is established by using two channels of Wi-Fi and 4G is used. However, actually, in the method provided in this embodiment of this application, three or more channels may be implemented.

As shown in FIG. 7, a dual-channel technology architecture provides a method for sending packets simultaneously based on two channels of a Wi-Fi network and a 4G network. The method provided in this embodiment of this application may be applied to two access manners of a client software development kit (SDK) or a client application (APP). A client APP 713 in FIG. 7 is used as an example for description, the same game data packet is sent to a proxy server 740 through Wi-Fi and 4G channels for aggregation and deduplication, and then the deduplicated game data packet is sent to a game server 750. When receiving a response data packet of the game server 750, the proxy server 740 separately sends the response data packet through the Wi-Fi channel and the 4G channel established with a client 710, thereby ensuring transmission stability of the game data packet and accessing a service for free.

Logic of a dual-channel client may include the following steps.

First, a game client 711 and the client APP 713 are started on the client 710 (for example, a mobile phone client, but is not limited thereto, which may be a terminal device of any type). After being started, the client APP 713 creates a virtual network interface card 7131 and establishes two threads for binding the Wi-Fi channel and the 4G channel.

In this embodiment of this application, the client APP 713 may send a request to a cloud control server 720 according to a corresponding game service configuration, and the cloud control server 720 delivers a game server IP to the client APP 713 according to the request. The client APP 713 sets a filtering policy IP tables according to the game server IP, intercepts a game data packet of the game client 711 from a real network interface card 712, and forwards the game data packet to the virtual network interface card 7131.

Because the mobile phone client may further have a plurality of other service data packets that are not game data packets, in this embodiment of this application, only the configured game data packets may be sent through two channels, and other service data packets that are not the game data packets may be still received and sent by using a single channel, thereby reducing occupied network traffic. Further, which game server or game data packets needs/need to be received and sent through two channels may be pre-configured and stored in the cloud control server 720, and the client APP 713 only intercepts a game data packet that needs to be sent through two channels and forwards the game data packet to the virtual network interface card 7131.

In this embodiment of this application, after receiving the game data packet from the virtual network interface card 7131, the client APP 713 encapsulates an uplink channel packet header by using an uplink processing module 7132, to form two uplink data packets, and separately sends the two uplink data packets to a load balancing server 731 and a load balancing server 732 through the Wi-Fi channel and the 4G channel.

In this embodiment of this application, the encapsulated uplink channel packet header may include the following information.

```
typedef struct MutiTunnelUPHead{
    uint32_t m_bussId; //game identifier
    uint8_t ver; //filling in primary channel identifier
    uint8_t type; //channel identifier, channel number or packet type of
current uplink data packet
    uint32_t seqno; //packet sequence number
    uint32_t clientKey; //unique identifier of client
    uint32_t devKey;//unique identifier of mobile phone device
    uint32_t dst_ip; //target IP
        uint16_t dst_port; //target port
        uint8_t mutisetID; // operator ID of primary channel
}MutiTunnelUPHead; //new-version protocol code.
```

The Wi-Fi channel is a primary channel by default, and if a channel number of the Wi-Fi channel is marked as 0, a primary channel identifier is 0. Correspondingly, that the channel identifier is 0 indicates that a channel type of a current uplink data packet is a Wi-Fi channel, and that the channel identifier is 1 indicates that a channel type of a current uplink data packet is a 4G channel. The unique identifier clientkey of the client may be obtained by using a hash32 algorithm.

In this embodiment of this application, if the Wi-Fi channel and the 4G channel belong to different operators and the channel is a primary channel, an operator ID mutisetID field of the primary channel is an operator identifier of the Wi-Fi channel and may be used for determining a proxy server cluster.

In this embodiment of this application, the client APP 713 may further receive, by using a downlink processing module 7133, a plurality of downlink data packets that are sent in parallel by the load balancing server 731 through the Wi-Fi channel and the load balancing server 732 through the 4G channel, remove downlink packet headers in the downlink data packets by using the downlink processing module 7133, perform deduplication through deduplication logic, and send the downlink data packet to the game client 711 by using the virtual network interface card 7131 and the real network interface card 712 in sequence.

In this embodiment of this application, the downlink packet header may include the following information.

```
typedef struct MutiTunnelDownHead{
    uint32_t seqno; //packet sequence number
    char data[0]; //packet content
}MutiTunnelDownHead.
```

In FIG. 7, the load balancing server 731 may further include a proxy service mapping module 7311, an uplink thread 7312, and a downlink thread 7313, and the load balancing server 732 may further include a proxy service mapping module 7321, an uplink thread 7322, and a downlink thread 7323. The proxy server 740 may further include a thread maintenance module 741, a communication maintenance module 742, a client 1 thread, a client 2 thread, to a client n thread. It is assumed that the client n thread 743 may further include a downlink processing module 7431 and an uplink processing module 7432. For a specific implementation function, reference may be made to the following embodiments.

In the embodiment shown in FIG. 7, for example, the Wi-Fi channel and the 4G channel are provided by different operators. Therefore, two load balancing server 731 and 732 are required, and similarly, if the method provided in this embodiment of this application is applied to three or more channels, the plurality of channels are provided by several operators, and several load balancing servers are required correspondingly. Similarly, if the plurality of channels are provided by one operator, only one load balancing server may be required.

In addition, although only one proxy server is shown in FIG. 7, in an actual case, there may be a proxy server cluster. In this embodiment of this application, a plurality of uplink data packets that are sent by a client in parallel through a plurality of channels are sent to the same proxy server by using the load balancing server, and the load balancing server needs to determine the same proxy server (or referred to as a proxy serving node) in a proxy server cluster according to information in uplink packet headers in the uplink data packets. Similarly, if the plurality of channels are respectively provided by a plurality of operators, there are a plurality of corresponding proxy server clusters. In this case, the proxy server cluster corresponding to a primary channel may be determined as a target cluster for determining the same proxy server according to the primary channel identifier in the uplink packet header.

In the multichannel data transmission method provided in the implementation of this application, the same game data packet is sent simultaneously through two channels of Wi-Fi and 4G, and as long as a game data packet on one of the network channels can normally arrive, user experience can still be normal, that is, disaster recovery processing is performed on a client-server end data receiving and sending network channel, to effectively prevent problems such as a packet loss and a high delay caused by Wi-Fi or 4G network jitter. In addition, the proxy server may further shield a network change to a game client and a game server. The game client and the game server is unaware of a switching behavior of different network environments, and may perform smooth switching. On the other hand, in the method provided in the embodiments of this application, in a complex mobile network environment, real-time game stuck experience can be effectively improved. In a case in which a Wi-Fi or 4G network is relatively poor, effectiveness of data transmission can still be well ensured. Especially, an optimization rate can be up to 90% for common Wi-Fi interference.

Figure 8:
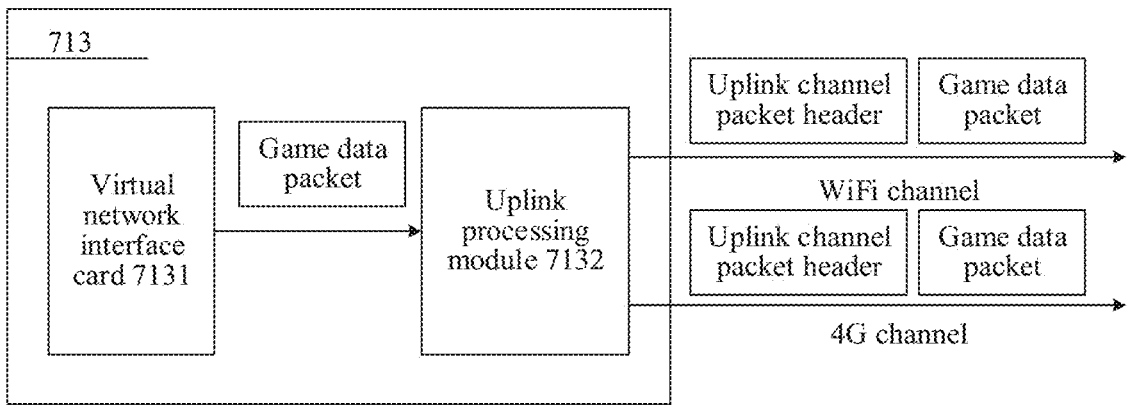
FIG. 8 is a schematic diagram of sending an uplink data packet by a client APP through a plurality of channels according to an embodiment of this application.

FIG. 8 is a schematic diagram of sending an uplink data packet by a client APP through a plurality of channels according to an embodiment of this application.

As shown in FIG. 8, the virtual network interface card 7131 in the client APP 713 sends a game data packet to the uplink processing module 7132, and the uplink processing module 7132 encapsulates an uplink packet header for the game data packet, to generate two uplink data packets, and separately sends the two uplink data packets through the Wi-Fi channel and the 4G channel.

Figure 9:
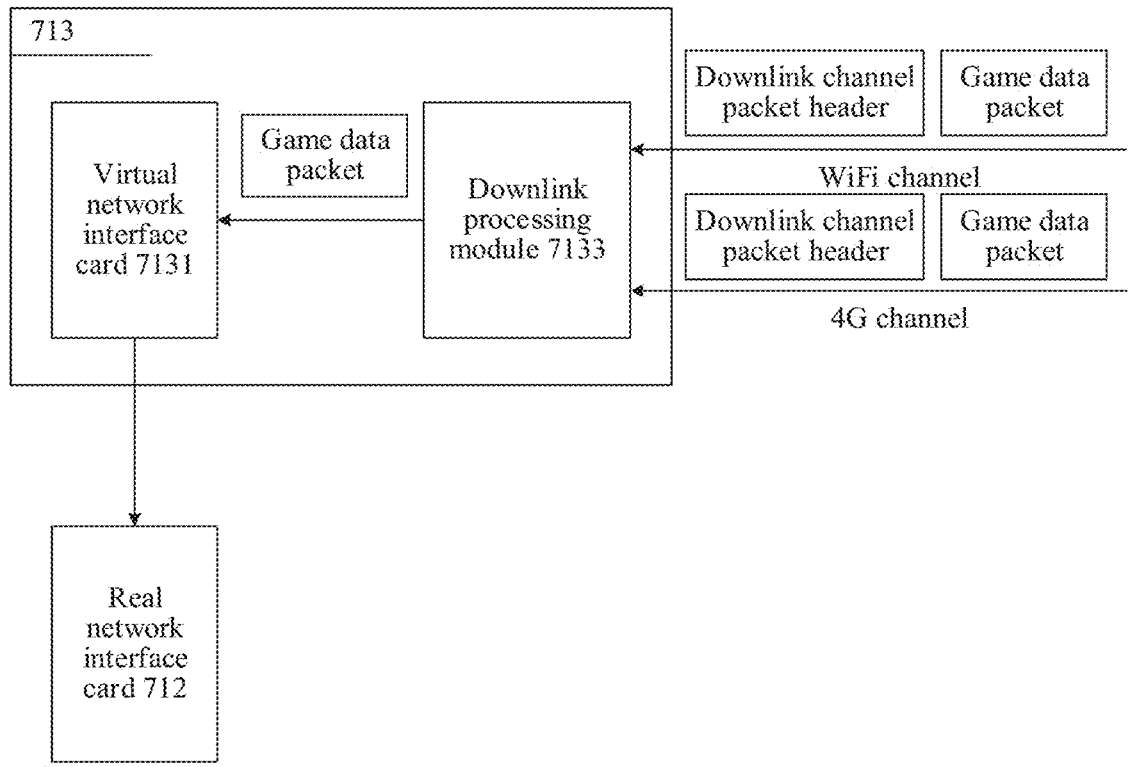
FIG. 9 is a schematic diagram of receiving a downlink data packet by a client APP through a plurality of channels according to an embodiment of this application.

FIG. 9 is a schematic diagram of receiving a downlink data packet by a client APP through a plurality of channels according to an embodiment of this application.

As shown in FIG. 9, the downlink processing module 7133 in the client APP 713 performs deduplication processing on a downlink data packet according to a downlink packet header, and then sends a game data packet obtained after the downlink packet header in the downlink data packet is removed through the deduplication processing to the virtual network interface card 7131, and the virtual network interface card 7131 forwards the game data packet to the real network interface card 712.

Figure 10:
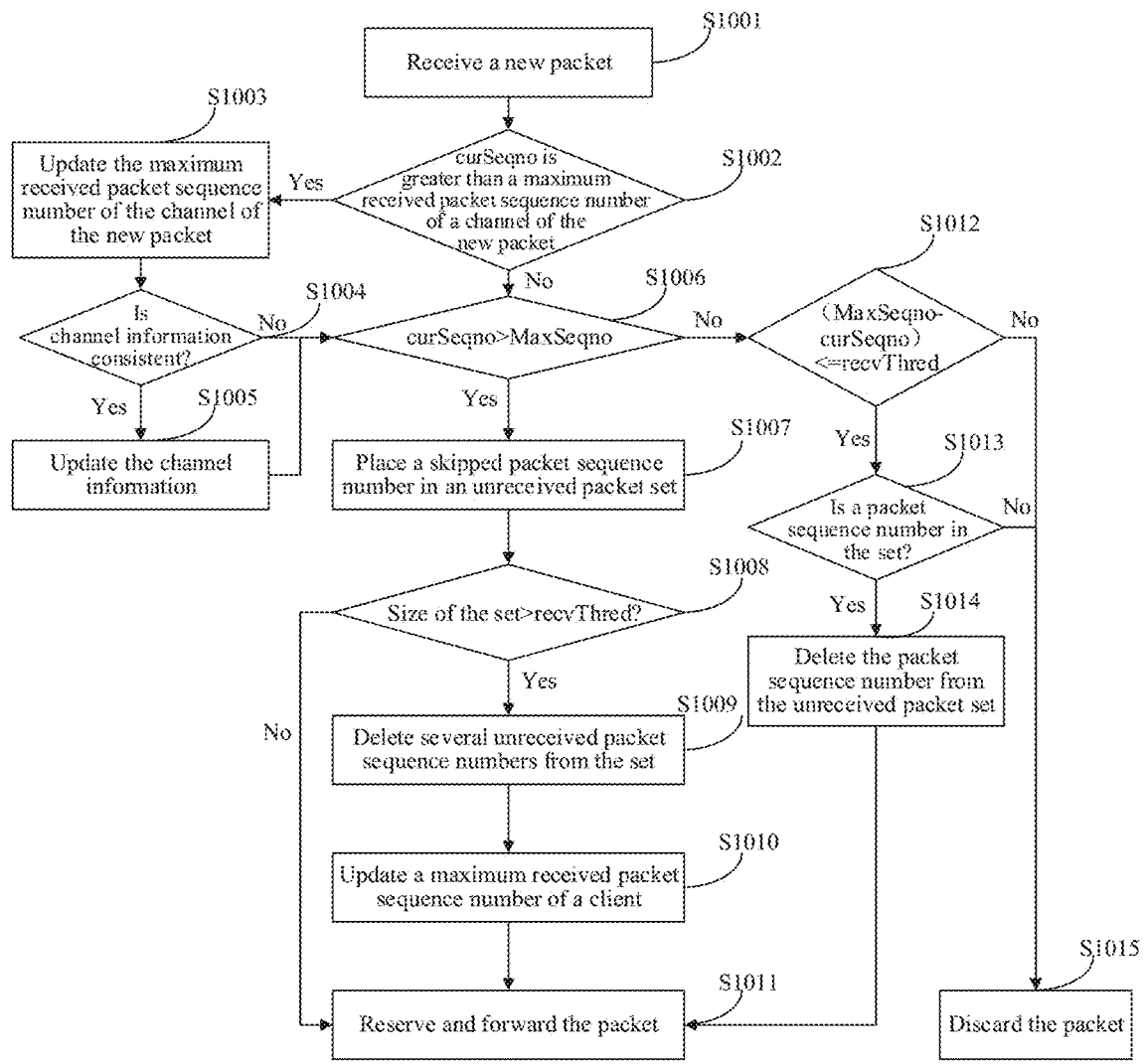
FIG. 10 is a schematic flowchart of a data packet deduplication method according to an embodiment of this application.

FIG. 10 is a schematic flowchart of a data packet deduplication method according to an embodiment of this application. Two data packet deduplication methods provided in FIG. 10 to FIG. 12 may be applied to both a client and a proxy server end.

As shown in FIG. 10, the data packet deduplication method provided in this embodiment of this application may include the following steps.

Step S1001 Receive a new packet.

Herein, a client receives a new downlink data packet, and a proxy server receives a new uplink data packet.

Step S1002. Determine whether a packet sequence number curSeqno of the new packet is greater than a maximum received packet sequence number of a channel of the new packet. If the packet sequence number curSeqno of the new packet is greater than the maximum received packet sequence number of the channel of the new packet, step S1003 is performed, and if the packet sequence number curSeqno of the new packet is less than the maximum received packet sequence number of the channel of the new packet, step S1006 is performed.

Herein, assuming that a packet sequence number of a received new packet is curSeqno, a channel type of the new packet may be determined according to a channel identifier in a packet header (an uplink packet header or a downlink packet header) of the new packet. For example, if the channel identifier of the new packet is 0, it may be learned that the new packet is sent through a Wi-Fi channel. In this case, a maximum received packet sequence number of the Wi-Fi channel corresponding to the new packet may be learned. If the packet sequence number curSeqno of the new packet is greater than the maximum received packet sequence number of the Wi-Fi channel, it indicates that this is a newly received packet for the Wi-Fi channel. If the packet sequence number curSeqno of the new packet is less than or equal to the maximum received packet sequence number of the Wi-Fi channel, it indicates that this is a previously received packet for the Wi-Fi channel.

In this embodiment of this application, a maximum received packet sequence number of a channel refers to a maximum packet sequence number previously received by the corresponding channel. However, for the plurality of channels, the maximum received packet sequence number of the channel is not necessarily equal to a maximum received packet sequence number of a client provided below.

Step S1003, Update the maximum received packet sequence number of the channel of the new packet.

For example, if the new packet is from the Wi-Fi channel, a packet sequence number of the new packet is 2, and a maximum received packet sequence number of the channel is 1, the maximum received packet sequence number of the Wi-Fi channel is updated to 2.

Step S1004, Determine whether channel information of the new packet is consistent with previously stored channel information of the channel of the new packet. If the channel information of the new packet is inconsistent with the previously stored channel information of the channel of the new packet, step S1006 is performed, and if the channel information of the new packet is consistent with the previously stored channel information of the channel of the new packet, step S1005 is performed.

For example, if the new packet is a new packet that is never received before for the Wi-Fi channel, in this case, whether the channel information such as a channel address of the new packet is consistent with a previously stored channel address of the Wi-Fi channel may be determined. If the channel information of the new packet is inconsistent with the previously stored channel address of the Wi-Fi channel; the channel address of the Wi-Fi channel is updated. In this way, it may be ensured that a latest channel address is stored, thereby maintaining correct connection between the client and the proxy server.

Step S1005. Update the channel information of the channel of the new packet.

Step S1003 and step S1004 may be performed in parallel.

Step S1006. Determine whether the packet sequence number curSeqno of the new packet is greater than a maximum received packet sequence number MaxSeqno of a client. If the packet sequence number curSeqno of the new packet is greater than the maximum received packet sequence number MaxSeqno of the client, step S1007 is performed.

In this embodiment of this application, the maximum received packet sequence number MaxSeqno of the client refers to a reserved and forwarded maximum packet sequence number that is previously received by the Wi-Fi channel and the 4G channel.

If curSeqno>MaxSeqno, it indicates that the new packet is a new packet that is never received before, and in this case, the new packet is reserved.

Step S1007, Place packet sequence numbers that are skipped between the packet sequence number curSeqno of the new packet and the maximum received packet sequence number MaxSeqno of the client into an unreceived packet set.

In this embodiment of this application, arrival times of packets sent in sequence according to a time sequence are not necessarily consistent. For example, a packet with a large packet sequence number is sent later but may arrive earlier. In this case, a packet sequence number of the new packet may be 1 or much greater than the maximum received packet sequence number MaxSeqno of the client. For example, if MaxSeqno is equal to 1 and curSeqno is 4, 4−1=3>1, that is, packets with packet sequence numbers of 2 and 3 are not received, and in this case, the packet sequence numbers 2 and 3 are placed into the unreceived packet set.

Step S1008. Determine whether a size of the unreceived packet set is greater than a first threshold recvThred. If size>recvThred, step S1009 is performed, and if size≤recvThred, step S1011 is performed.

For example, the first threshold may be set to 10, but this application is not limited thereto.

Step S1009, Delete several minimum unreceived packet sequence numb from the unreceived packet set.

The objective of the step is to limit the size of the unreceived packet set and maintain a quantity of packet sequence numbers in the unreceived packet set within the first threshold range.

Step S1010. Update the maximum received packet sequence number MaxSeqno of the client.

Step S1011. Reserve and forward the packet.

Step S1009, step S1010, and step S1011 may not be performed according to a chronological order and may be performed in parallel.

Step S1012. Determine whether a difference between the maximum received packet sequence number MaxSeqno of the client and the packet sequence number of the new packet is greater than the first threshold. If (MaxSeqno−curSeqno)≤recvThred, step S1013 is performed, and if (MaxSeqno−curSeqno)>recvThred, step S1015 is performed.

In this embodiment of this application, if the packet sequence number of the new packet is less than the maximum received packet sequence number MaxSeqno of the client by the first threshold recvThred, the new packet is discarded.

For example, assuming that the packet sequence number of the new packet is 7, the maximum received packet sequence number MaxSeqno of the client is 20, and the first threshold recvThred is 10, 20−7=13>10, and in this case, the new packet with the packet sequence number of 7 is discarded.

The first threshold is an adjustable value and is to limit a duration of the proxy, server or the client waiting for a packet. In this case, a specific quantity of packet losses may be accepted. If a response level is high, the first threshold may be set smaller, for example, 10, and if the response level is low, the first threshold may be set larger, for example, 100. Even, the first threshold may be alternatively set to a maximum value in all packet sequence numbers. In this case, it is equivalent to waiting indefinitely without packet loss.

Step S1013. Determine whether the packet sequence number curSeqno of the new packet is in the unreceived packet set. If the packet sequence number curSeqno of the new packet is in the unreceived packet set, step S1014 is performed, and if the packet sequence number curSeqno of the new packet is not in the unreceived packet set, step S1015 is performed.

Step S1014. Delete the packet sequence number curSeqno of the new packet from the unreceived packet set, perform step S1011, and reserve the new packet and forward the new packet.

For example, the maximum received packet sequence number MaxSeqno of the client is 20, and the first threshold recvThred is 10. Assuming that the packet sequence number of the new packet is 17, in this case, 20−17=3<10, and a packet with a packet sequence number of 17 is never received before, that is, the packet sequence number of 17 is in the unreceived packet set, and the new packet is received. Otherwise, if a packet with a packet sequence number of 17 is previously received, that is, the packet sequence number of 17 is not in the unreceived packet set, and the new packet is discarded.

Step S1015. Discard the new packet.

In an exemplary embodiment, the method may further include: updating a quantity of first arrived packets of each channel and a quantity of arrived packets of each channel, which may be used for counting a data transmission effect of each channel.

Figure 11:
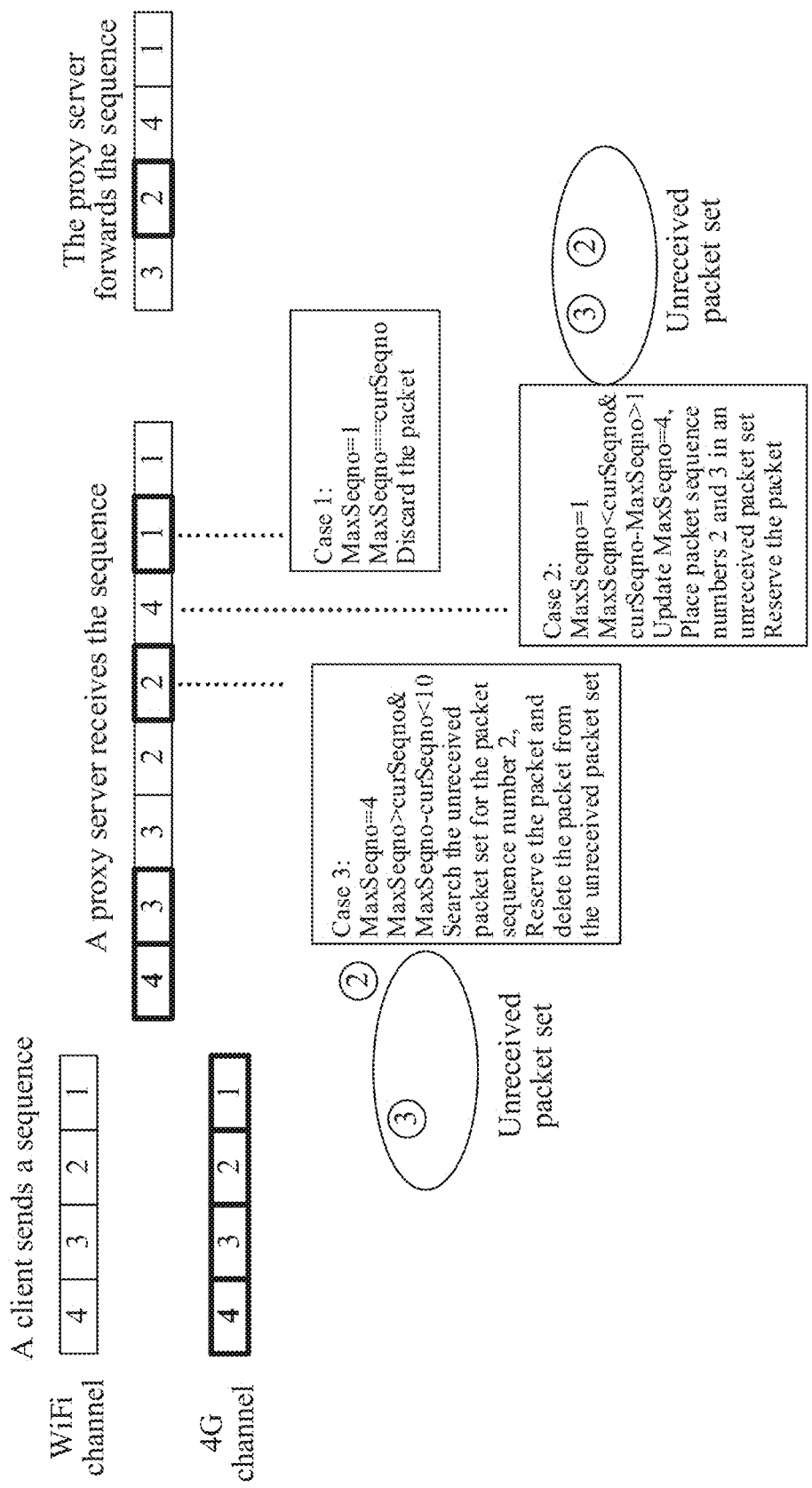
FIG. 11 is a schematic diagram of an example based on the data packet deduplication method shown in FIG. 10.

FIG. 11 is a schematic diagram of an example based on the data packet deduplication method shown in FIG. 10.

As shown in FIG. 11, it is assumed that packet sequence numbers of sequences sent by a client of a Wi-Fi channel are 1, 2, 3, and 4 in sequence, packet sequence numbers of sequences sent by a client of a 4G channel are also 1, 2, 3, and 4 in sequence, and packet sequence numbers of sequences received by a proxy server are 1 of the Wi-Fi channel, 1 of the 4G channel, 4 of the Wi-Fi channel, 2 of the 4G channel, 2 and 3 of the Wi-Fi channel, and 3 and 4 of the 4G channel in sequence.

Herein, assuming that the proxy server first receives a packet of the Wi-Fi channel with a packet sequence number of 1, the packet is reserved and forwarded, and MaxSeqno=1 is updated.

Next, the proxy server receives a packet of the 4G channel with a packet sequence number of 1. In this case, a corresponding case 1: MaxSeqno=MaxSeqno=curSeqno, and the packet is discarded.

Next, the proxy server receives a packet of the Wi-Fi channel with a packet sequence number of 4. In this case, a corresponding case 2: MaxSeqno=, MaxSeqno<curSeqno&curSeqno-MaxSeqno>1, MaxSeqno=4 is updated, skipped packet sequence numbers 2 and 3 are placed into an unreceived packet set, and the packet is reserved.

Next, the proxy server receives a packet of the 4G channel with a packet sequence number of 2. In this case, a corresponding case 3: MaxSeqno=4, MaxSeqno>curSeqno&MaxSeqno-curSeqno<10, the unreceived packet set is searched for the packet sequence number 2, the packet is reserved and is deleted from the unreceived packet set, and only the packet sequence number 3 is left in the unreceived packet set.

Finally, packet sequence numbers of sequences forwarded by the proxy server are 1 of the Wi-Fi channel, 4 of the Wi-Fi channel, 2 of the 4G channel, and 3 of the Wi-Fi channel in sequence.

Figure 12:
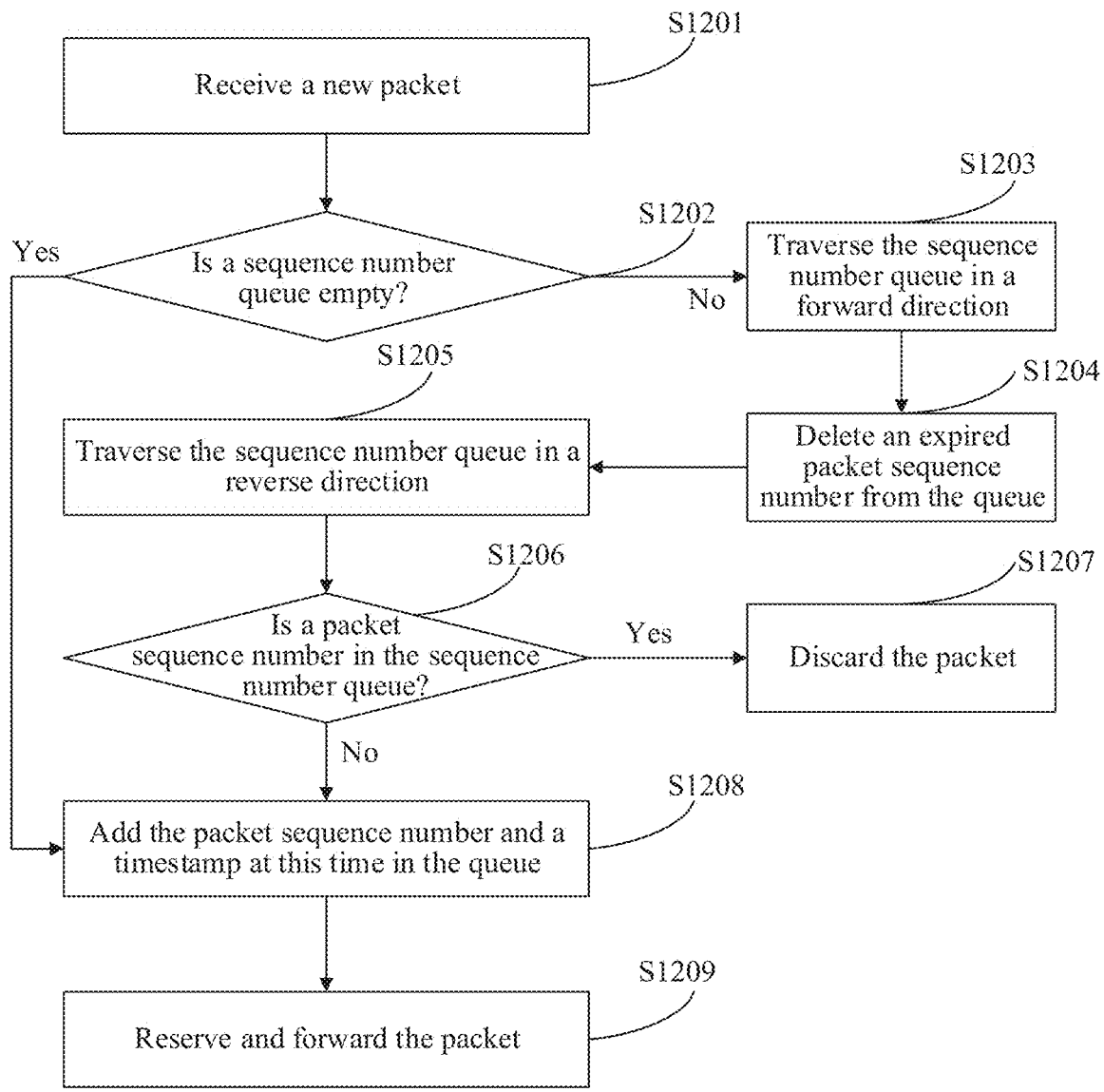
FIG. 12 is a schematic flowchart of a data packet deduplication method according to another embodiment of this application.

FIG. 12 is a schematic flowchart of a data packet deduplication method according to another embodiment of this application.

As shown in FIG. 12, the data packet deduplication method provided in this embodiment of this application may include the following steps.

Step S1201. Receive a new packet.

Step S1202. Determine whether a sequence number queue is empty. If the sequence number queue is empty, step S1208 is performed, and if the sequence number queue is not empty, step S1203 is performed.

In this embodiment of this application, if a sequence number queue corresponding to the client is empty, a packet sequence number of the new packet and a time stamp at this time are added to the sequence number queue, and the packet is reserved and forwarded.

Step S1203. Traverse the sequence number queue in a forward direction.

Step S1204. Delete an expired packet sequence number from the sequence number queue.

In this embodiment of this application, if the sequence number queue is not empty, the sequence number queue is traversed in the forward direction, a packet sequence number in which a time difference between an adding time and a current time exceeds a second threshold (for example, 500 ms) in the sequence number queue is determined, and the packet sequence number and a time stamp of the packet sequence number are removed from the sequence number queue.

The second threshold is also an adjustable value, and specifically, a duration limit for maintaining the sequence number queue is considered, to avoid excessive packet sequence numbers in the queue. This may result in that, for example, a packet sequence number received before 500 ms is removed from the sequence number queue, and the same packet sequence number is re-received after 500 ms, that is, a packet may be received repeatedly, but no packet is lost.

Step S1205. Traverse the sequence number queue in a reverse direction.

The forward traversal and the reverse traversal in the foregoing steps are only, for saving an execution time. This is actually not limited.

Step S1206. Determine whether a packet sequence number of the new packet is in the sequence number queue. If the packet sequence number of the new packet is in the sequence number queue, step S1207 is performed.

Step S1207. Discard the new packet.

If a packet sequence number in the sequence number queue is the same as the packet sequence number of the new packet, the new packet is discarded.

Step S1208. Add the packet sequence number of the new packet and a timestamp at this time into the sequence number queue.

If all sequence numbers in the sequence number queue are different from the packet sequence number of the new packet, the packet sequence number of the new packet and the timestamp at this time are added into the sequence number queue, and the new packet is reserved and forwarded.

Step S1209. Reserve and forward the new packet.

In this embodiment of this application, deduplication logic is not limited to the two methods listed above, and the packet may be deduplicated by using any proper deduplication method according to an actual situation.

Figure 13:
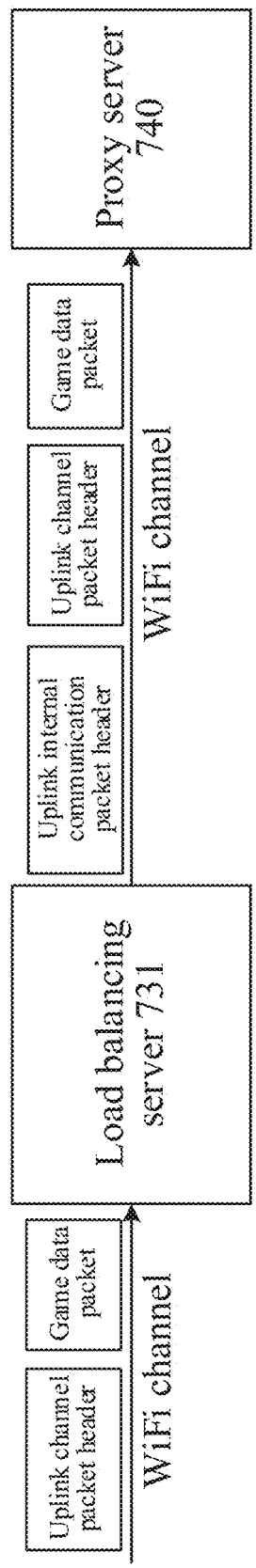
FIG. 13 is a schematic diagram of a load balancing server according to an embodiment of this application.

FIG. 13 is a schematic diagram of a load balancing server according to an embodiment of this application.

During access of a user on an outer network, Wi-Fi and 4G cross-network (between different operators) occurs. For example, it is assumed that the Wi-Fi broadband operator is China Mobile, and the 4G operator is China Telecom, To resolve this problem, a load balancing service needs to be provided at a dual-channel backend access layer.

FIG. 13 is load balancing server logic in a dual-channel server end. Herein, a load balancing server 731 is used as an example for description.

A client ARP sends an uplink data packet of a Wi-Fi channel or a 4G channel to a corresponding operator access point.

The load balancing server 731 receives the uplink data packet through the Wi-Fi channel. In this case, the uplink data packet includes an uplink channel packet header and a game data packet. The load balancing server 731 parses the uplink channel packet header to obtain a clientkey value and an operator ID of a primary channel corresponding to a mutisetID field in the packet header, so that it may be learned that the received uplink data packet is sent to which proxy server in a proxy server cluster in an operator. Specifically, a proxy service mapping module 7311 in the load balancing server 731 may calculate a proxy serving node according to the clientkey value.

In this embodiment of this application, an uplink thread 7312 in the load balancing server 731 further encapsulates an uplink internal communication packet header for the received uplink data packet, to form the uplink data packet including the uplink internal communication packet header, the uplink channel packet header, and the game data packet, and forwards the uplink data packet to the calculated proxy server 740.

In this embodiment of this application, the uplink internal communication packet header may store client address information. For example:

```
typedef struct InerPkg{
    struct sockaddr_in clientInfo; //client address information
    char data[0];
}InerPkg;
```

Figure 14:
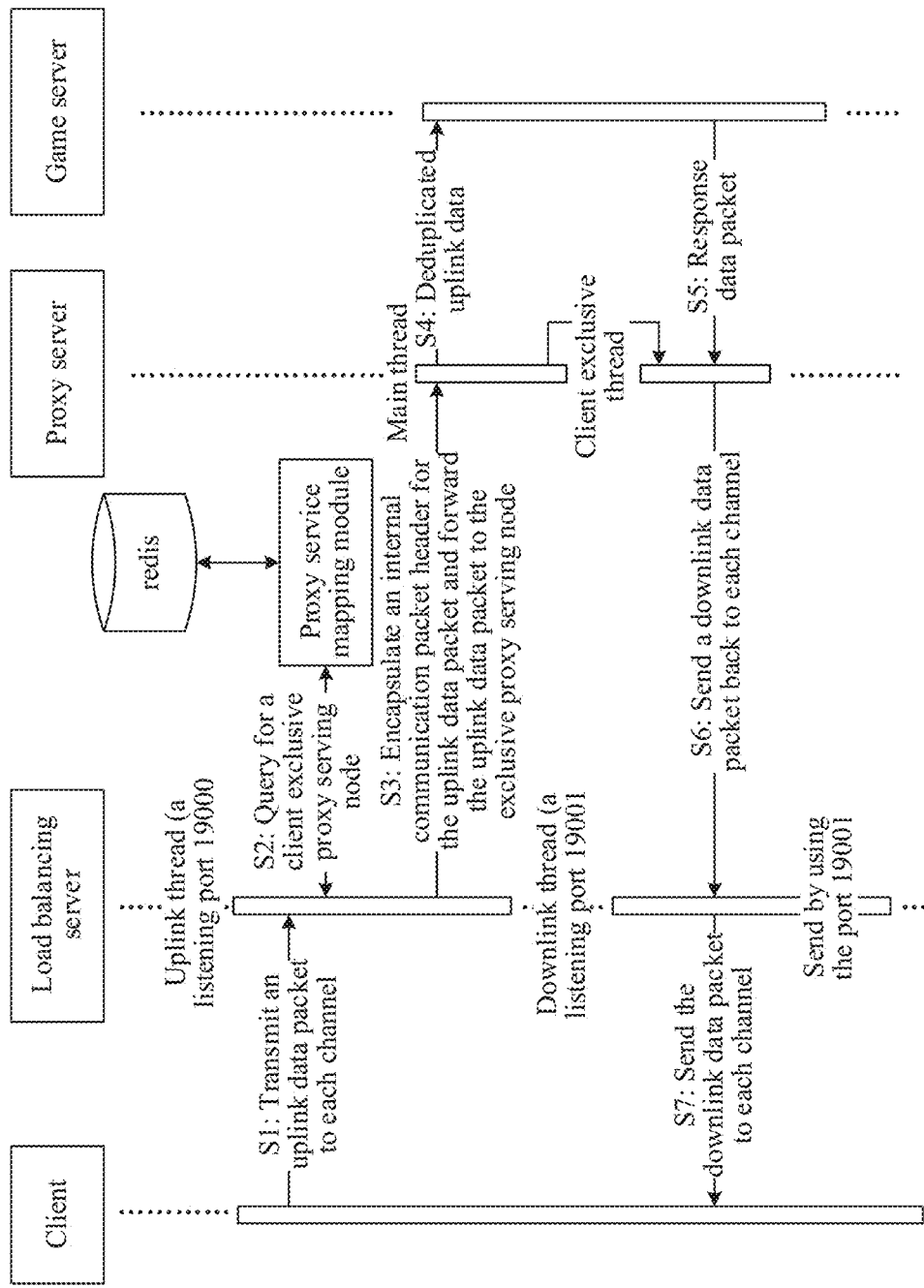
FIG. 14 is a schematic logical sequence diagram of an internal interaction between a load balancing server and a proxy server according to an embodiment of this application.

FIG. 14 is a schematic logical sequence diagram of an internal interaction between a load balancing server and a proxy server according to an embodiment of this application.

As shown in FIG. 14, step S1. A client sends an uplink data packet to a load balancing server through each channel, specifically to an uplink thread monitoring port 19000 of the load balancing server (this is an example for description and this application is not limited thereto).

Step S2, A proxy service mapping module in the load balancing server and a redis communicate with each other, to obtain latest proxy serving node information, and meanwhile, the proxy service mapping module calculates, according to a clientkey in an uplink channel packet header of a received uplink data packet, a client exclusive proxy serving node to which the currently received uplink data packet is to be sent.

In this embodiment of this application, the redis may be considered as a database. The proxy server in the proxy server cluster may change, for example, a new proxy server is added, an old proxy server is deleted, or an original proxy server is replaced. Therefore, to ensure that the proxy service mapping module can obtain an accurate exclusive proxy serving node through calculation, e latest proxy server information needs to be stored in the redis, and then when calculating the proxy serving node to which a current packet is to be forwarded, the proxy service mapping module of the load balancing server reads the latest proxy server information in the redis to calculate.

A storage device configured to store the proxy server information is not limited to the redis, and may be another storage device of any type.

Step S3. The load balancing server continues to encapsulate an uplink internal communication packet header based on the received uplink data packet, and forwards the uplink data packet to the exclusive proxy serving node found in step S2.

Step S4: Create a client exclusive thread by using a main thread of the proxy server, remove the uplink internal communication packet header and the uplink channel packet header of the uplink data packet by using the client exclusive thread, and send a game data packet in the deduplicated uplink data packet to a game server.

In this embodiment of this application, the proxy server starts an exclusive thread for each client, and the exclusive thread is used for listening to whether a new packet is sent to each client and a game server.

Step S5: The proxy server receives, by using the client exclusive thread, a response data packet returned by the game server in response to the received game data packet.

Step S6: The proxy server encapsulates a downlink internal communication packet header and a downlink channel packet header for the response data packet to form a downlink data packet, and sends the downlink data packet to each channel to the load balancing server.

Step S7: The load balancing server sends the downlink data packet to each channel to the client through a port 19001.

Figure 15:
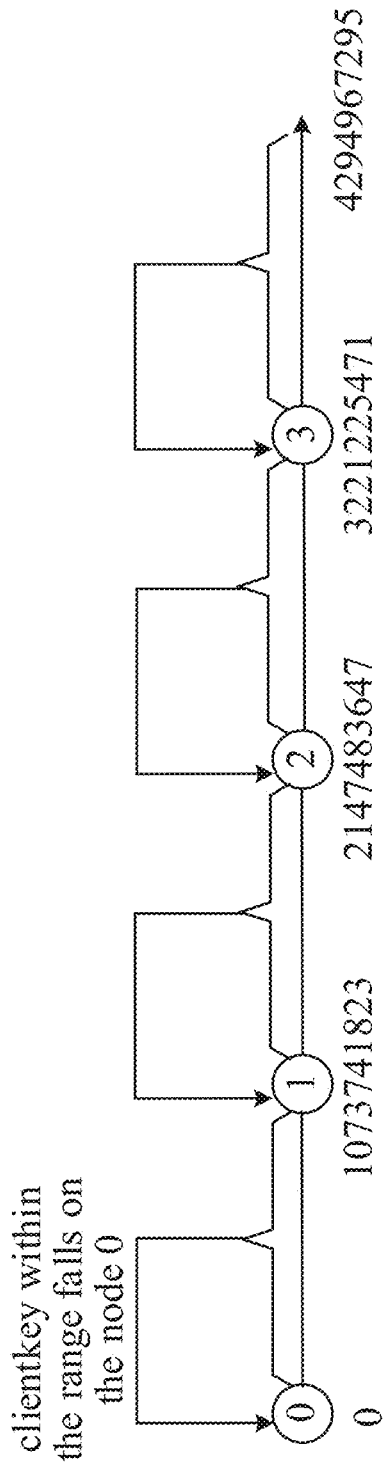
FIG. 15 is a schematic diagram of a proxy service mapping module of a load balancing server according to an embodiment of this application.

FIG. 15 is a schematic diagram of a proxy service mapping module of a load balancing server according to an embodiment of this application.

In this embodiment of this application, the proxy service mapping module divides the proxy server into several clusters according to operators, for example, four clusters: China Telecoms, China Mobile, China Unicom, and small and medium bandwidth operators. The proxy service mapping module evenly allocates N (N is an integer greater than or equal to 0) proxy serving nodes in each cluster to a range of 0 to 4294967295 (the value is only used as an example for description and this application is not limited thereto).

In this embodiment of this application, a corresponding proxy serving node is calculated by using a clientkey value. The calculation formula may be as follows:

svrNum (a quantity of dual-channel proxy nodes)//assumed to be 4 herein

MAX//maximum value, assumed to be 4294967295 herein svrInterval=MAX/svrNum// assumed to be 1073741823.75 herein;

Index=(clientkey/svrInterval)% svrNum;//% is a modulus operation

The index is a proxy node number that is obtained through calculation, and each node number represents an address of a proxy server.

As shown in FIG. 15:

0≤clientkey<1073741823, falling on the node 0;

1073741823≤clientkey<2147483647, falling on the node 1;

2147483647≤clientkey<3221225471, falling on the node 2;

3221225471≤clientkey<4294967295, falling on the node 3.

In this embodiment of this application, each client has one exclusive thread, that is, after the same transmission channel is established; clientkey values of a plurality of uplink data packets sent by a Wi-Fi channel and a 4G channel are all the same, After the current transmission channel is disconnected, the clientkey values are changed after the same client reestablishes the transmission channel.

In this embodiment of this application, to ensure that the proxy server may perform online dynamic capacity expansion in parallel, the proxy server may be expanded as received and sent data packets increase, and the proxy service mapping module accesses a redis cluster every a preset time such as every second and obtains a latest proxy server list. If the latest proxy server list is inconsistent with a latest proxy server node, an operation of adding, deleting, or replacing is completed.

Figure 16:
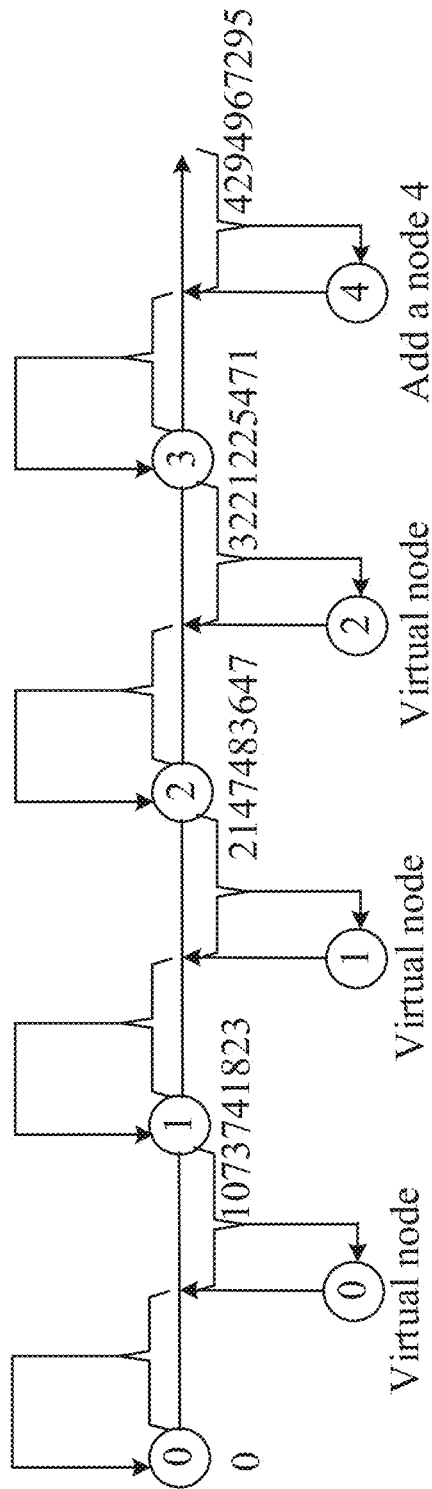
FIG. 16 is a schematic diagram of a proxy service mapping module of a load balancing server according to another embodiment of this application.

FIG. 16 is a schematic diagram of a proxy service mapping module of a load balancing server according to another embodiment of this application.

FIG. 16 is an example of node update logic for description. Assuming that a node 4 is added behind the node 3, according to the foregoing formula for calculating the index, because svrInterval is at an equal interval, a virtual node needs to be added behind each original node. For example, virtual nodes 0, 1, and 2 are added to maintain consistency of the node calculation formula. Proxy server address information represented by a virtual node and proxy server address information represented by a previous node of the virtual node are the same. In this case, a quantity of nodes svrNum is doubled. For example, svrNum is equal to 8.

A new node may be added at any location, and is not limited to be added behind the node 3.

Figure 17:
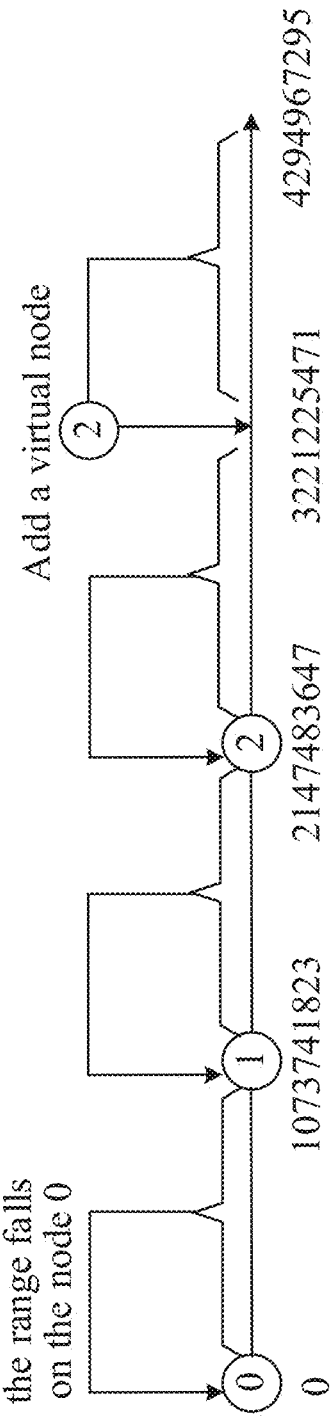
FIG. 17 is a schematic diagram of a proxy service mapping module of a load balancing server according to still another embodiment of this application.

FIG. 17 is a schematic diagram of a proxy service mapping module of a load balancing server according to still another embodiment of this application.

FIG. 17 is an example of deleting a proxy serving node. Assuming that the node 3 is deleted, a virtual node 2 needs to be added to complement a deleted location. Similarly, to maintain an equal interval feature, address information of the virtual node is the same as that of the previous node.

Figure 18:
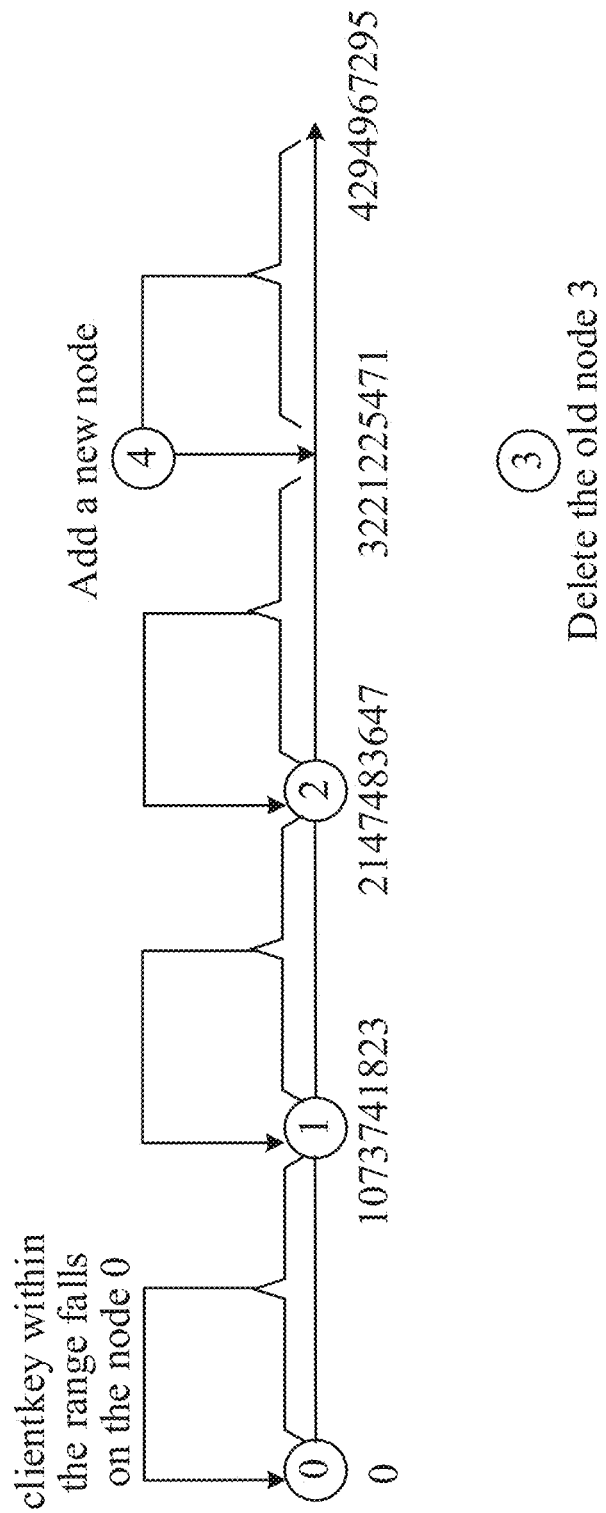
FIG. 18 is a schematic diagram of a proxy service mapping module of a load balancing server according to yet another embodiment of this application.

FIG. 18 is a schematic diagram of a proxy service mapping module of a load balancing server according to yet another embodiment of this application.

FIG. 18 is an example of replacing a proxy serving node. Assuming that the old node 3 is replaced, the node 3 may be replaced with information of a new node 4. For example, performance of a proxy server is degraded, and the proxy server is replaced by a new proxy server.

Figure 19:
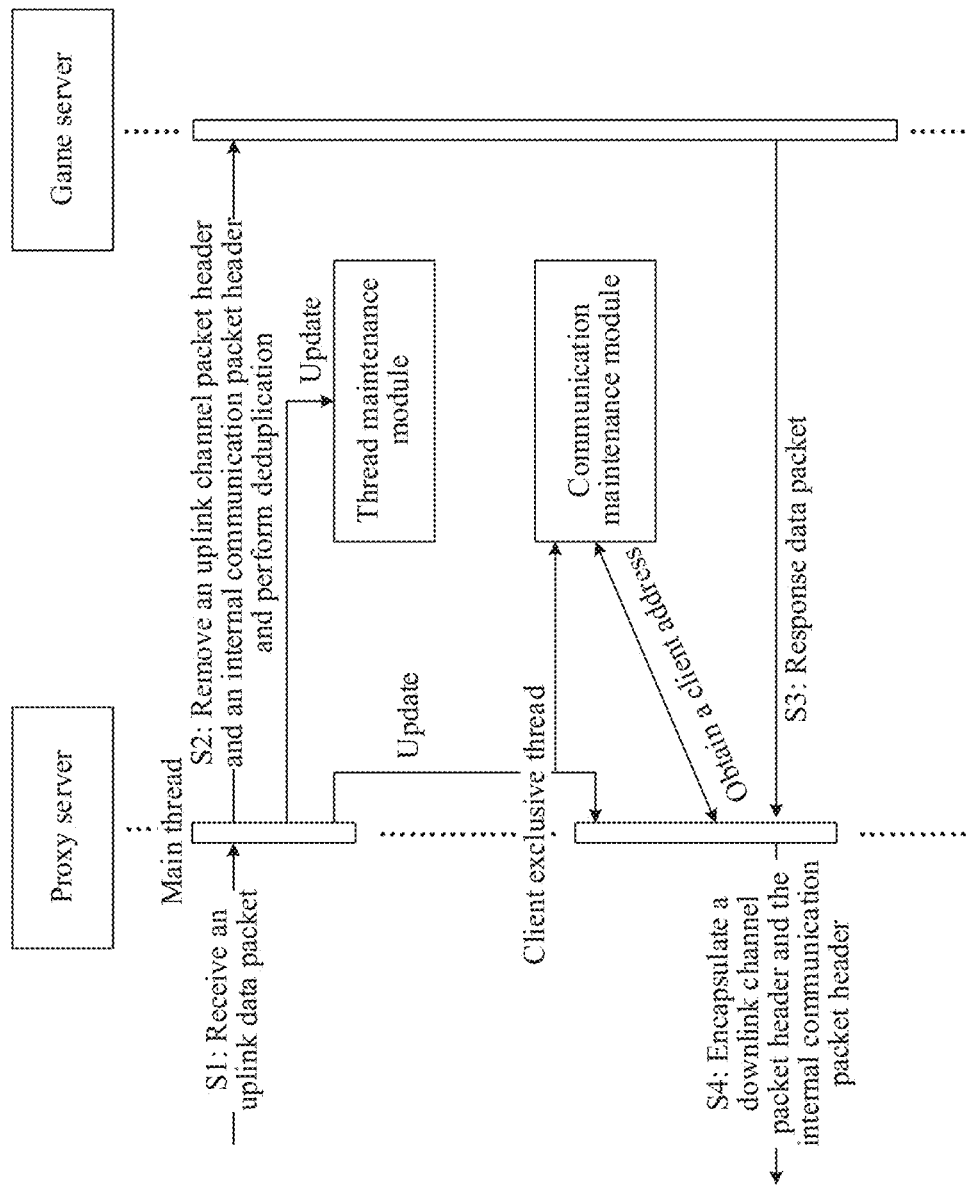
FIG. 19 is a schematic logical sequence diagram of a proxy server according to an embodiment of this application.

FIG. 19 is a schematic logical sequence diagram of a proxy server according to an embodiment of this application.

As shown in FIG. 19, step S1. A proxy server receives an uplink data packet.

Step S2. The proxy server removes an uplink channel packet header and an uplink internal communication packet header of the uplink data packet, deduplicates the uplink data packet, and then sends a game data packet to a game server. In addition, the proxy, server updates a thread maintenance module, so that a client creates an exclusive thread at the proxy server for service and updates information in the thread maintenance module.

In this embodiment of this application, when newly receiving an uplink data packet sent by a client, the proxy server removes an uplink channel packet header and an uplink internal communication packet header of the uplink data packet to obtain client address information, and records the client address information in a communication maintenance module. In this way, it is ensured that when subsequently encapsulating a downlink packet header, the thread maintenance module may copy a piece of corresponding client address information from the communication maintenance module, and encapsulate the corresponding client address information in a downlink internal communication packet header, so that the proxy server may learn which client a downlink data packet is forwarded to.

In this embodiment of this application, the client sends channel information of an uplink data packet to the proxy server in real time, to help the proxy server to perform channel switching, thereby ensuring that when abnormal switching occurs in a 4G or channel, the proxy server may instantly update channel information corresponding to the client. The channel information maintains channel packet header ver and type fields.

The channel switching mainly refers to internal switching of 4G or internal switching of Wi-Fi. Because a 4G address and a Wi-Fi address may be changed, in this embodiment of this application, a connection between the client and the proxy server may be maintained according to the latest channel information.

There is another abnormal case, for example, Wi-Fi is a primary channel. If Wi-Fi is abnormal and cannot be networked, 4G may be switched to the primary channel, and the channel packet header ver field is correspondingly changed. In this case, a downlink data packet may be sent to the client only through the 4G channel. However, in this case, an operation such as encapsulating a downlink packet header may still be completed by using a proxy server in a proxy server cluster of an operator corresponding to without switching to a proxy server cluster of a 4G operator.

In this embodiment of this application, the proxy server may identify, according to a unique identifier clientkey value of a client in an uplink channel packet header in an uplink data packet, client data sent from a 4G channel and a Wi-Fi channel and perform deduplication processing on the client data. For a deduplication algorithm, reference may be made to the foregoing embodiments in FIG. 10 to FIG. 12.

In this embodiment of this application, the proxy server establishes a unique link for a client and a game server, and sends a deduplicated game data packet to the game server.

Step S3: The game server returns a response data packet in response to the game data packet.

Step S4: The proxy server obtains a client address from a communication maintenance module, encapsulates the client address into a downlink internal communication packet header of the response data packet, encapsulates a downlink channel packet header for the response data packet, and then forwards the response data packet.

In this embodiment of this application, a client thread created by the proxy server listens to a dedicated link established by the client thread and the game server. After a response data packet returned by the game server is received, a downlink channel packet header and a downlink internal communication packet header are encapsulated according to latest address information of a Wi-Fi channel and a 4G channel in the communication maintenance module, and two formed downlink data packets are separately sent to the two channels.

In this embodiment of this application, the proxy server may further clear client channel information regularly. For example, if no client data passes through the proxy server within a timeout time, threads and the channel information data of the client are cleared.

Figure 20:
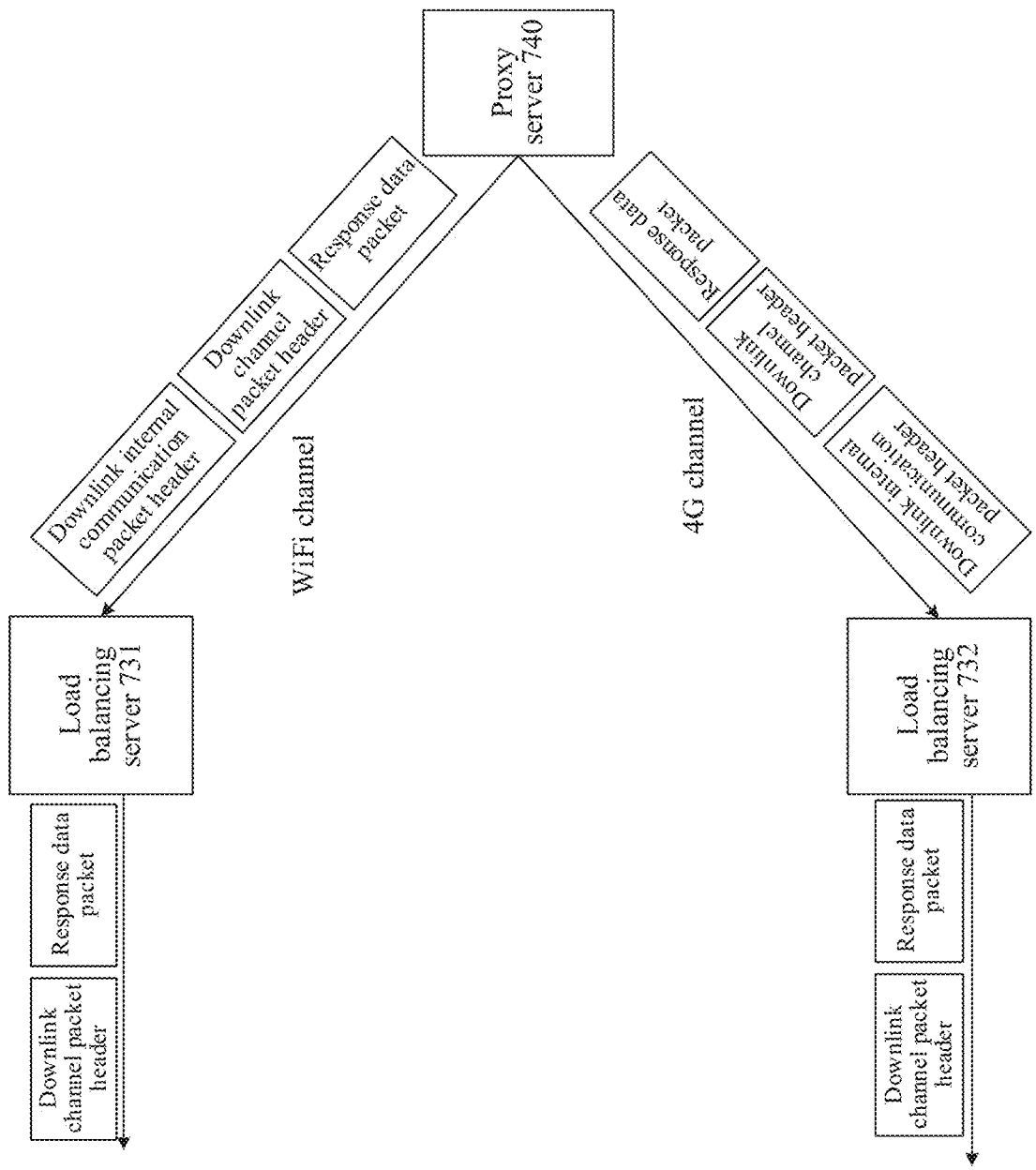
FIG. 20 is a schematic diagram of sending a downlink data packet by a proxy, server through a plurality of channels according to an embodiment of this application.

FIG. 20 is a schematic diagram of sending a downlink data packet by a proxy server through a plurality of channels according to an embodiment of this application.

As shown in FIG. 20, a proxy server 740 respectively sends, through a Wi-Fi channel and a 4G channel, a response data packet encapsulated with a downlink internal communication packet header and a downlink channel packet header, that is, a downlink data packet, to a load balancing server 731 and a load balancing server 732.

After removing the downlink internal communication packet header of the downlink data packet, the load balancing server 731 sends the downlink data packet to a service client (not shown in the figure)) through the Wi-Fi channel.

After removing the downlink internal communication packet header of the downlink data packet, the load balancing server 732 sends the downlink data packet to the service client (not shown in the figure) through the 4G channel.

In this embodiment of this application, after receiving a downlink data packet sent by the proxy server, a downlink thread in the load balancing server removes a downlink internal communication packet header, obtains client address information, and forwards the downlink data packet including a downlink channel packet header and a response data packet to the service client.

In this solution, the dual-channel load balancing server is mainly used to send data packets of different operators of a Wi-Fi channel and a 4G channel to the same dual-channel proxy server by using a proxy service mapping module. Some operators have corresponding dual-channel proxy server clusters. However, in this solution, only a dual-channel proxy server cluster of an operator corresponding to a primary channel (which is the Wi-Fi channel by default) may be used. Even if an abnormal shutdown of the Wi-Fi channel may subsequently occur, the primary channel is changed into the 4G channel by using ver and type fields. In this case, because acceleration and initialization have been completed, a downlink data packet is still sent by using the dual-channel proxy server cluster of the operator corresponding to the Wi-Fi channel. In some cases, a downlink packet may be sent only through a primary channel, but in this solution, the downlink packet is sent through two channels.

The method provided in the implementation of this application is relatively flexible, and most services may be accessed for free without any change and adaption. In addition, when a fault occurs in a Wi-Fi or 4G upper-layer network, a user is completely unaware, and 70% or more client stuck cases can be prevented. The effect is relatively Obvious especially in a case of a relatively complex Wi-Fi network.

The following describes apparatus embodiments of this application, which may be used for performing the foregoing multichannel data transmission method of this application. For details undisclosed in the apparatus embodiments of this application, refer to the embodiments of the foregoing multichannel data transmission method in this application.

Figure 21:
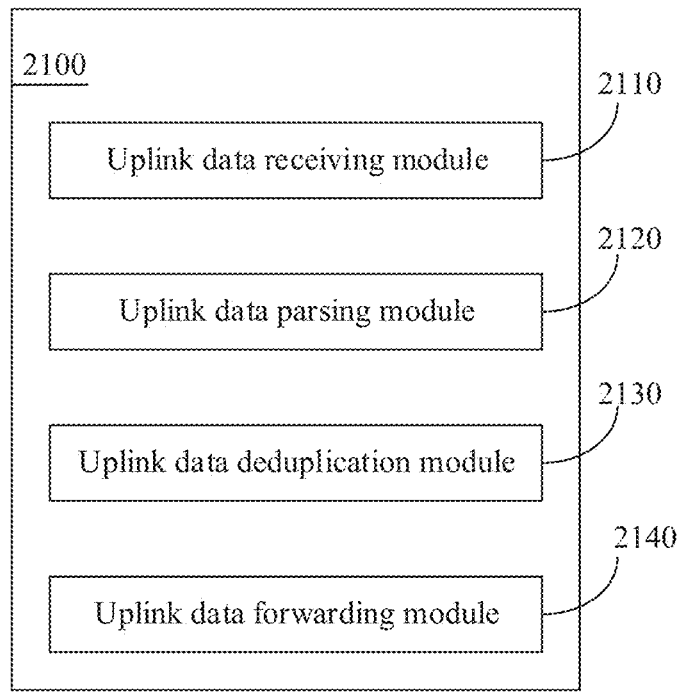
FIG. 21 is a schematic block diagram of a multichannel data transmission apparatus according to an embodiment of this application.

FIG. 21 is a schematic block diagram of a multichannel data transmission apparatus according to an embodiment of this application.

As shown in FIG. 21, the multichannel data transmission apparatus 2100 provided in the implementation of this application may include an uplink data receiving module 2110, an uplink data parsing module 2120, an uplink data deduplication module 2130, and an uplink data forwarding module 2140.

The uplink data receiving module 2110 is configured to receive a plurality of uplink data packets in parallel through a plurality of channels.

The uplink data parsing module 2120 is configured to parse the plurality of uplink data packets to obtain a plurality of target service data packets and a plurality of uplink packet headers.

The uplink data deduplication module 2130 is configured to perform deduplication processing on the plurality of target service data packets according to the plurality of uplink packet headers.

The uplink data forwarding module 2140 is configured to transmit the target service data packets reserved after the deduplication processing to a target service server.

Each uplink packet header may include a packet sequence number of each uplink data packet.

In an exemplary embodiment, the uplink data deduplication module 2130 may include: a first packet discarding unit, configured to discard a corresponding target service data packet in a case that (MaxSeqno-curSeqno)>recvThred, and discard a corresponding target service data packet in a case that MaxSeqno-curSeqno)≥recvThred and curSeqno is not in an unreceived packet set.

In an exemplary embodiment, the uplink data deduplication module 2130 may further include: a first packet reserving unit, configured to reserve a corresponding target service data packet in a case that (MaxSeqno-curSeqno)>recvThred, and reserve a corresponding target service data packet in a case that (MaxSeqno-curSeqno)≤recvThred and curSeqno is in the unreceived packet set.

curSeqno is a packet sequence number of the uplink data packet, MaxSeqno is a maximum received packet sequence number of a client, and recvThred is a first threshold.

In an exemplary embodiment, the uplink data deduplication module 2130 may include: a second packet reserving unit, configured to add the packet sequence number of the uplink data packet to a sequence number queue in a case that the packet sequence number of the uplink data packet is different from all packet sequence numbers in the sequence number queue, and reserve a corresponding target service data packet; and a second packet discarding unit, configured to discard a corresponding target service data packet in a case that the packet sequence number of the uplink data packet is the same as any packet sequence number in the sequence number queue.

In an exemplary embodiment, each uplink packet header further includes a channel identifier and channel information of each uplink data packet.

In an exemplary embodiment, the multichannel data transmission apparatus 2100 may further include: a channel type determining module, configured to determine a channel type of the uplink data packet according to the channel identifier, and a channel information updating module, configured to update channel information of a corresponding channel type in a case that the packet sequence number of the uplink data packet is greater than a maximum received packet sequence number of a channel of the corresponding channel type and corresponding channel information is inconsistent with channel information stored in the corresponding channel type.

In an exemplary embodiment, the multichannel data transmission apparatus 2100 may further include: a response data receiving module, configured to receive response data packets generated by the target service server in response to the target service data packets, a downlink data generation module, configured to separately encapsulate corresponding downlink packet headers for the response data packets according to latest channel information of channel types, to generate a plurality of downlink data packets, and a downlink data transmission module, configured to transmit the plurality of downlink data packets to a service client in parallel through the plurality of channels.

Figure 22:
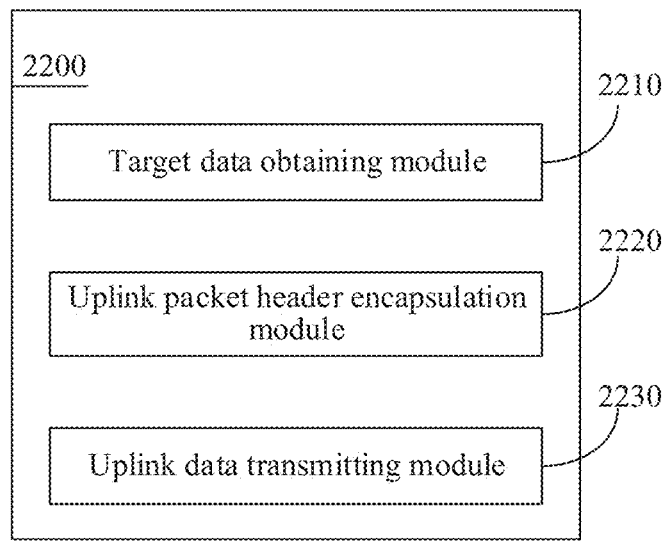
FIG. 22 is a schematic block diagram of a multichannel data transmission apparatus according to another embodiment of this application.

FIG. 22 is a schematic block diagram of a multichannel data transmission apparatus according to another embodiment of this application.

As shown in FIG. 22, the multichannel data transmission apparatus 2200 provided in the implementation of this application may include a target data obtaining module 2210, an uplink packet header encapsulation module 2220, and an uplink data transmission module 2230.

The target data obtaining module 2210 is configured to obtain tar service data packets.

The uplink packet header encapsulation module 2220 is configured to separately encapsulate uplink packet headers for the target service data packets, to form a plurality of uplink data packets.

The uplink data transmission module 2230 is configured to transmit the plurality of uplink data packets to a proxy server in parallel through a plurality of channels.

Each uplink packet header may include a packet sequence number of each uplink data packet.

In an exemplary embodiment, the multichannel data transmission apparatus 2200 may further include: a downlink data receiving module, configured to receive, in parallel through the plurality of channels, a plurality of downlink data packets generated in response to the target service data packets, a downlink data parsing module, configured to parse the plurality of downlink data packets to obtain a plurality of response data packets and a plurality of downlink packet headers, and a downlink data deduplication module, configured to perform deduplication processing on the plurality of response data packets according to the plurality of downlink packet headers.

In an exemplary embodiment, the target data obtaining module 2210 includes: a service server information obtaining unit, configured to control a server according to a service configuration request, to obtain target service server information, a filtering policy setting unit, configured to set a filtering policy according to the target service server information, and a target service data interception unit, configured to intercept the target service data packets according to the filtering policy.

Although a plurality of modules or units of a device for action execution are mentioned in the foregoing detailed descriptions, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software in combination with necessary hardware. Therefore, the technical solutions of the implementations of this application may be implemented in a form of a software product. The software product may be stored in a non-transitory computer-readable storage medium (which may be a CD-ROM, a USB flash drive, a removable hard disk, or the like) or on a network, and includes several instructions for instructing a computing device (which may be a personal computer, a server, a touch terminal, network device, or the like) to perform the methods according to the implementations of this application.

A person skilled in the art can easily figure out another implementation solution of this application after considering the specification and practicing this application that is disclosed herein. This application is intended to cover any variations, uses or adaptation of this application following the general principles of this application, and includes the well-known knowledge and conventional technical means in the art and undisclosed in this application. The specification and the embodiments are merely considered as examples, and the actual scope and the spirit of this application are pointed out by the following claims.

It is to be understood that this application is not limited to the accurate structures that are described in the foregoing and that are shown in the accompanying drawings, and modifications and changes may be made without departing from the scope of this application. The scope of this application is limited by the appended claims only.

What is claimed is:

1. A multichannel data transmission method, applied to a proxy server having one or more processors and a memory storing a plurality of programs to be executed by the one or more processors, the method comprising:
   receiving, from a mobile terminal, a plurality of uplink data packets in parallel through a plurality of channels;
   parsing the plurality of uplink data packets to obtain a plurality of target service data packets and a plurality of uplink packet headers;
   performing deduplication processing on the plurality of target service data packets according to the plurality of uplink packet headers by:
      discarding a corresponding target service data packet when (i) (MaxSeqno-curSeqno)>recvThred, or (ii) (MaxSeqno-curSeqno)≤recvThred and curSeqno is not in an unreceived packet set, wherein MaxSeqno is a maximum received packet sequence number from the mobile terminal, curSeqno is a packet sequence number of an uplink data packet, and recvThred is a first threshold; and
      reserving a corresponding target service data packet when (i) curSeqno>MaxSeqno or (ii) (MaxSeqno-curSeqno)≤recvThred and curSeqno is in the unreceived packet set; and
   transmitting the target service data packets reserved after the deduplication processing to a target service server, each uplink packet header comprising a packet sequence number of each uplink data packet.

2. The method according to claim 1, wherein the performing deduplication processing on the plurality of target service data packets according to the plurality of uplink packet headers comprises:
   when a packet sequence number of an uplink data packet is different from all packet sequence numbers in a sequence number queue, adding the packet sequence number of the uplink data packet to the sequence number queue and reserving a corresponding target service data packet for the uplink data packet; and
   when the packet sequence number of the uplink data packet is the same as one packet sequence number in the sequence number queue, discarding a corresponding target service data packet for the uplink data packet.

3. The method according to claim 1, wherein each uplink packet header further comprises a channel identifier and channel information of an uplink data packet, and the method further comprises:
   determining a channel type of the uplink data packet according to the channel identifier; and
   updating channel information of a corresponding channel type when the packet sequence number of the uplink data packet is greater than a maximum received packet sequence number of a channel of the corresponding channel type and corresponding channel information is inconsistent with channel information stored in the corresponding channel type.

4. The method according to claim 3, further comprising:
   receiving, from the target service server, response data packets in response to the target service data packets;
   separately encapsulating corresponding downlink packet headers for the response data packets according to latest channel information of channel types, to generate a plurality of downlink data packets; and
   transmitting the plurality of downlink data packets to the mobile terminal in parallel through the plurality of channels.

5. The method according to claim 4, wherein the mobile terminal is configured to:
   receive, in parallel through the plurality of channels, the plurality of downlink data packets generated in response to the target service data packets;
   parse the plurality of downlink data packets to obtain a plurality of response data packets and a plurality of downlink packet headers; and
   perform deduplication processing on the plurality of response data packets according to the plurality of downlink packet headers.

6. The method according to claim 1, wherein the mobile terminal is configured to:
generate the plurality of target service data packets;
separately encapsulate the plurality of uplink packet headers for the plurality of target service data packets, to form the plurality of uplink data packets; and
transmit the plurality of uplink data packets to the proxy server in parallel through the plurality of channels.

7. The method according to claim 1, wherein the mobile terminal is configured to:
obtain target service server information according to a service configuration request;
set a filtering policy according to the target service server information; and
intercept the target service data packets according to the filtering policy.

8. A proxy server, comprising:
one or more processors;
a memory communicatively connected to the one or more processors; and
a plurality of programs stored in the memory and executable by the one or more processors, the plurality of programs, when executed by the one or more processors, causing the proxy server to perform a plurality of operations including:
receiving, from a mobile terminal, a plurality of uplink data packets in parallel through a plurality of channels;
parsing the plurality of uplink data packets to obtain a plurality of target service data packets and a plurality of uplink packet headers;
performing deduplication processing on the plurality of target service data packets according to the plurality of uplink packet headers by:
 discarding a corresponding target service data packet when (i) (MaxSeqno-curSeqno)>recvThred, or (ii) (MaxSeqno-curSeqno)≤recvThred and curSeqno is not in an unreceived packet set, wherein MaxSeqno is a maximum received packet sequence number from the mobile terminal, curSeqno is a packet sequence number of an uplink data packet, and recvThred is a first threshold; and
 reserving a corresponding target service data packet when (i) curSeqno>MaxSeqno or (ii) (MaxSeqno-curSeqno)≤recvThred and curSeqno is in the unreceived packet set; and
transmitting the target service data packets reserved after the deduplication processing to a target service server, each uplink packet header comprising a packet sequence number of each uplink data packet.

9. The proxy server according to claim 8, wherein the performing deduplication processing on the plurality of target service data packets according to the plurality of uplink packet headers comprises:
when a packet sequence number of an uplink data packet is different from all packet sequence numbers in a sequence number queue, adding the packet sequence number of the uplink data packet to the sequence number queue and reserving a corresponding target service data packet for the uplink data packet; and
when the packet sequence number of the uplink data packet is the same as one packet sequence number in the sequence number queue, discarding a corresponding target service data packet for the uplink data packet.

10. The proxy server according to claim 8, wherein each uplink packet header further comprises a channel identifier and channel information of an uplink data packet, and the plurality of operations further comprise:

determining a channel type of the uplink data packet according to the channel identifier; and
updating channel information of a corresponding channel type when the packet sequence number of the uplink data packet is greater than a maximum received packet sequence number of a channel of the corresponding channel type and corresponding channel information is inconsistent with channel information stored in the corresponding channel type.

11. The proxy server according to claim 10, wherein the plurality of operations further comprise:
receiving, from the target service server, response data packets in response to the target service data packets;
separately encapsulating corresponding downlink packet headers for the response data packets according to latest channel information of channel types, to generate a plurality of downlink data packets; and
transmitting the plurality of downlink data packets to the mobile terminal in parallel through the plurality of channels.

12. The proxy server according to claim 11, wherein the mobile terminal is configured to:
receive, in parallel through the plurality of channels, the plurality of downlink data packets generated in response to the target service data packets;
parse the plurality of downlink data packets to obtain a plurality of response data packets and a plurality of downlink packet headers; and
perform deduplication processing on the plurality of response data packets according to the plurality of downlink packet headers.

13. The proxy server according to claim 8, wherein the mobile terminal is configured to:
generate the plurality of target service data packets;
separately encapsulate the plurality of uplink packet headers for the plurality of target service data packets, to form the plurality of uplink data packets; and
transmit the plurality of uplink data packets to the proxy server in parallel through the plurality of channels.

14. The proxy server according to claim 8, wherein the mobile terminal is configured to:
obtain target service server information according to a service configuration request;
set a filtering policy according to the target service server information; and
intercept the target service data packets according to the filtering policy.

15. A non-transitory computer-readable storage medium, storing a plurality of programs that, when executed by one or more processors of a proxy server, cause the proxy server to perform a plurality of operations including:
receiving, from a mobile terminal, a plurality of uplink data packets in parallel through a plurality of channels;
parsing the plurality of uplink data packets to obtain a plurality of target service data packets and a plurality of uplink packet headers;
performing deduplication processing on the plurality of target service data packets according to the plurality of uplink packet headers by:
 discarding a corresponding target service data packet when (i) (MaxSeqno-curSeqno)>recvThred, or (ii) (MaxSeqno-curSeqno)≤recvThred and curSeqno is not in an unreceived packet set, wherein MaxSeqno is a maximum received packet sequence number from the mobile terminal, curSeqno is a packet sequence number of an uplink data packet, and recvThred is a first threshold; and reserving a corresponding target service data packet when (i) curSeqno>MaxSeqno or (ii) (MaxSeqno-curSeqno)≤recvThred and curSeqno is in the unreceived packet set; and transmitting the target service data packets reserved after the deduplication processing to a target service server, each uplink packet header comprising a packet sequence number of each uplink data packet.

16. The non-transitory computer-readable storage medium according to claim 15, wherein the performing deduplication processing on the plurality of target service data packets according to the plurality of uplink packet headers comprises:

when a packet sequence number of an uplink data packet is different from all packet sequence numbers in a sequence number queue, adding the packet sequence number of the uplink data packet to the sequence number queue and reserving a corresponding target service data packet for the uplink data packet; and when the packet sequence number of the uplink data packet is the same as one packet sequence number in the sequence number queue, discarding a corresponding target service data packet for the uplink data packet.

17. The non-transitory computer-readable storage medium according to claim 15, wherein each uplink packet header further comprises a channel identifier and channel information of an uplink data packet, and the plurality of operations further comprise:

determining a channel type of the uplink data packet according to the channel identifier; and updating channel information of a corresponding channel type when the packet sequence number of the uplink data packet is greater than a maximum received packet sequence number of a channel of the corresponding channel type and corresponding channel information is inconsistent with channel information stored in the corresponding channel type.

18. The non-transitory computer-readable storage medium according to claim according to claim 17, wherein the plurality of operations further comprise:

receiving, from the target service server, response data packets in response to the target service data packets;

separately encapsulating corresponding downlink packet headers for the response data packets according to latest channel information of channel types, to generate a plurality of downlink data packets; and transmitting the plurality of downlink data packets to the mobile terminal in parallel through the plurality of channels.

\* \* \* \* \*